US011216730B2

(12) United States Patent
Wu et al.

(10) Patent No.: US 11,216,730 B2
(45) Date of Patent: Jan. 4, 2022

(54) UTILIZING MACHINE LEARNING TO PERFORM A MERGER AND OPTIMIZATION OPERATION

(71) Applicant: Capital One Services, LLC, McLean, VA (US)

(72) Inventors: Angelina Wu, Vienna, VA (US); Brian Lee, Chantilly, VA (US); Gaurang Bhatt, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/814,624

(22) Filed: Mar. 10, 2020

(65) Prior Publication Data

US 2021/0287082 A1    Sep. 16, 2021

(51) Int. Cl.
*G06N 3/08* (2006.01)
*G06Q 30/06* (2012.01)

(52) U.S. Cl.
CPC ........... *G06N 3/08* (2013.01); *G06Q 30/0631* (2013.01)

(58) Field of Classification Search
CPC .... G06N 3/08; G06N 20/00–20; G06Q 30/02; G06Q 30/0201; G06Q 30/0241; G06Q 30/0631
USPC ......... 706/12, 15; 705/7.11, 7.29, 7.31, 14.4
See application file for complete search history.

(56) References Cited

U.S. PATENT DOCUMENTS

| 8,566,187 | B2 | 10/2013 | Keld et al. | |
|---|---|---|---|---|
| 8,620,785 | B1* | 12/2013 | Wilks | G06Q 90/00 705/35 |
| 8,688,595 | B2* | 4/2014 | Pfeffer | G06Q 30/02 705/320 |
| 10,269,078 | B2* | 4/2019 | Sarkar | G06Q 40/12 |
| 10,475,125 | B1* | 11/2019 | Kumari | G06N 5/04 |
| 2009/0048931 | A1* | 2/2009 | Rabson | G06Q 40/12 705/14.17 |
| 2014/0278741 | A1* | 9/2014 | Batra | G06Q 30/0201 705/7.29 |

(Continued)

FOREIGN PATENT DOCUMENTS

WO    WO-2019112092 A1 *   6/2019   ............. G06Q 50/00

OTHER PUBLICATIONS

Tarang Shah, "Train, Validation, and Test Sets", Dec. 2017, retrieved from: https://web.archive.org/web/20180325015112/https://tarangshah.com/blog/2017-12-03/train-validation-and-test-sets/.*

*Primary Examiner* — Jue Louie
(74) *Attorney, Agent, or Firm* — Harrity & Harrity, LLP

(57) ABSTRACT

A device may comprise a memory and a processor coupled to the memory. The processor may receive transaction information and entity information for a plurality of entities and may generate a first model based on the transaction information, the entity information, and information identifying an event, a theme, or a transaction parameter. The processor may process, using the first model, the transaction information and the entity information to identify a set of related entities and a type of relationship associated with the set of related entities. The processor may determine, using a second model, one or more modifications to a first set of accounts and a second set of accounts associated with the first and second entities based on the type of relationship and may perform one or more actions based on the one or more modifications.

20 Claims, 21 Drawing Sheets

(56) References Cited

U.S. PATENT DOCUMENTS

| | | | | |
|---|---|---|---|---|
| 2015/0154615 A1* | 6/2015 | Pawar | ................ | G06Q 30/0201 |
| | | | | 705/7.29 |
| 2016/0371792 A1* | 12/2016 | Luo | .................... | G06Q 30/0201 |
| 2017/0076271 A1* | 3/2017 | Jones-McFadden | ........................ | |
| | | | | G06Q 20/227 |
| 2018/0336488 A1* | 11/2018 | Cai | ........................ | G06N 5/003 |
| 2019/0180358 A1* | 6/2019 | Nandan | .................. | G06Q 40/02 |
| 2019/0361918 A1* | 11/2019 | Rogynskyy | ............... | G06F 7/14 |

* cited by examiner

UTILIZING MACHINE LEARNING TO PERFORM A MERGER AND OPTIMIZATION OPERATION

BACKGROUND

Technologies for processing transaction-related data enable data to be processed to provide information to computing components for intelligent analysis and feedback to users. Monitoring transactions enables back-end and client-side systems to analyze and provide targeted feedback.

SUMMARY

According to some implementations, a method may include receiving, by a device, transaction information for a plurality of entities, wherein the transaction information identifies a plurality of transactions associated with the plurality of entities; receiving, by the device, entity information associated with the plurality of entities; performing, by the device, a training operation when generating a first model by portioning the transaction information, the entity information, and information identifying an event, a theme, or a transaction parameter associated with a plurality of types of relationships into a training set, a validation set, and a test set, wherein performing the training operation comprises: using the training set to fit the first model, using the validation set to provide an evaluation of a fit of the first model on the training set while tuning the first model, and using the test set to provide an evaluation of the first model on the training set; processing, by the device and using the first model, the transaction information and the entity information to identify a set of related entities and a type of relationship associated with the set of related entities, wherein the set of related entities is a subset of the plurality of entities, wherein the set of related entities includes a first entity and a second entity, wherein the first model receives, as inputs, the transaction information and the entity information, and wherein the first model outputs information identifying the set of related entities and the type of relationship associated with the set of related entities based on the set of related entities being associated with the event, the theme, or the transaction parameter; determining, by the device and using a second model, one or more first modifications to a first set of accounts associated with the first entity and one or more second modifications to a second set of accounts associated with the second entity based on the type of relationship associated with the set of related entities, wherein the second model receives information identifying the first set of accounts, information identifying the second set of accounts, and information identifying the type of relationship, and wherein the second model outputs information identifying the one or more first modifications and the one or more second modifications; and performing, by the device, one or more actions based on at least one of the determined one or more first modifications or the determined one or more second modifications.

According to some implementations, a device may include one or more memories; and one or more processors, communicatively coupled to the one or more memories, configured to: receive transaction information for a plurality of entities, wherein the transaction information identifies a plurality of transactions associated with the plurality of entities; receive entity information associated with the plurality of entities; generate a first model based on the transaction information, the entity information, and information identifying an event, a theme, or a transaction parameter associated with a plurality of types of relationships; process, using the first model, the transaction information and the entity information to identify a set of related entities and a type of relationship associated with the set of related entities, wherein the set of related entities is a subset of the plurality of entities, wherein the set of related entities includes a first entity and a second entity, wherein the first model receives, as inputs, the transaction information and the entity information, and wherein the first model outputs information identifying the set of related entities and the type of relationship associated with the set of related entities based on the set of related entities being associated with the event, the theme, or the transaction parameter; determine, using a second model, one or more first modifications to a first set of accounts associated with the first entity and one or more second modifications to a second set of accounts associated with the second entity based on the type of relationship associated with the set of related entities, wherein the second model receives information identifying the first set of accounts, information identifying the second set of accounts, and information identifying the type of relationship, and wherein the second model outputs information identifying the one or more first modifications and the one or more second modifications; and perform one or more actions based on at least one of the one or more first modifications or the one or more second modifications.

According to some implementations, a non-transitory computer-readable medium may store one or more instructions. The one or more instructions, when executed by one or more processors of a device, may cause the one or more processors to: receive transaction information for a plurality of entities, wherein the transaction information identifies a plurality of transactions associated with the plurality of entities; receive entity information associated with the plurality of entities; process, using a first model, the transaction information and the entity information to identify a set of related entities and a type of relationship associated with the set of related entities, wherein the set of related entities is a subset of the plurality of entities, wherein the set of related entities includes a first entity and a second entity, wherein the first model receives, as inputs, the transaction information and the entity information, and wherein the first model outputs information identifying the set of related entities and the type of relationship associated with the set of related entities based on the set of related entities being associated with an event, a theme, or a transaction parameter; determine, using a second model, one or more potential modifications to a set of accounts associated with the set of related entities based on the type of relationship associated with the set of related entities, wherein the second model receives information identifying the set of accounts and information identifying the type of relationship, and wherein the second model outputs information identifying the one or more potential modifications; and provide, via a network, information identifying the one or more potential modifications.

DETAILED DESCRIPTION

Figure 1A:
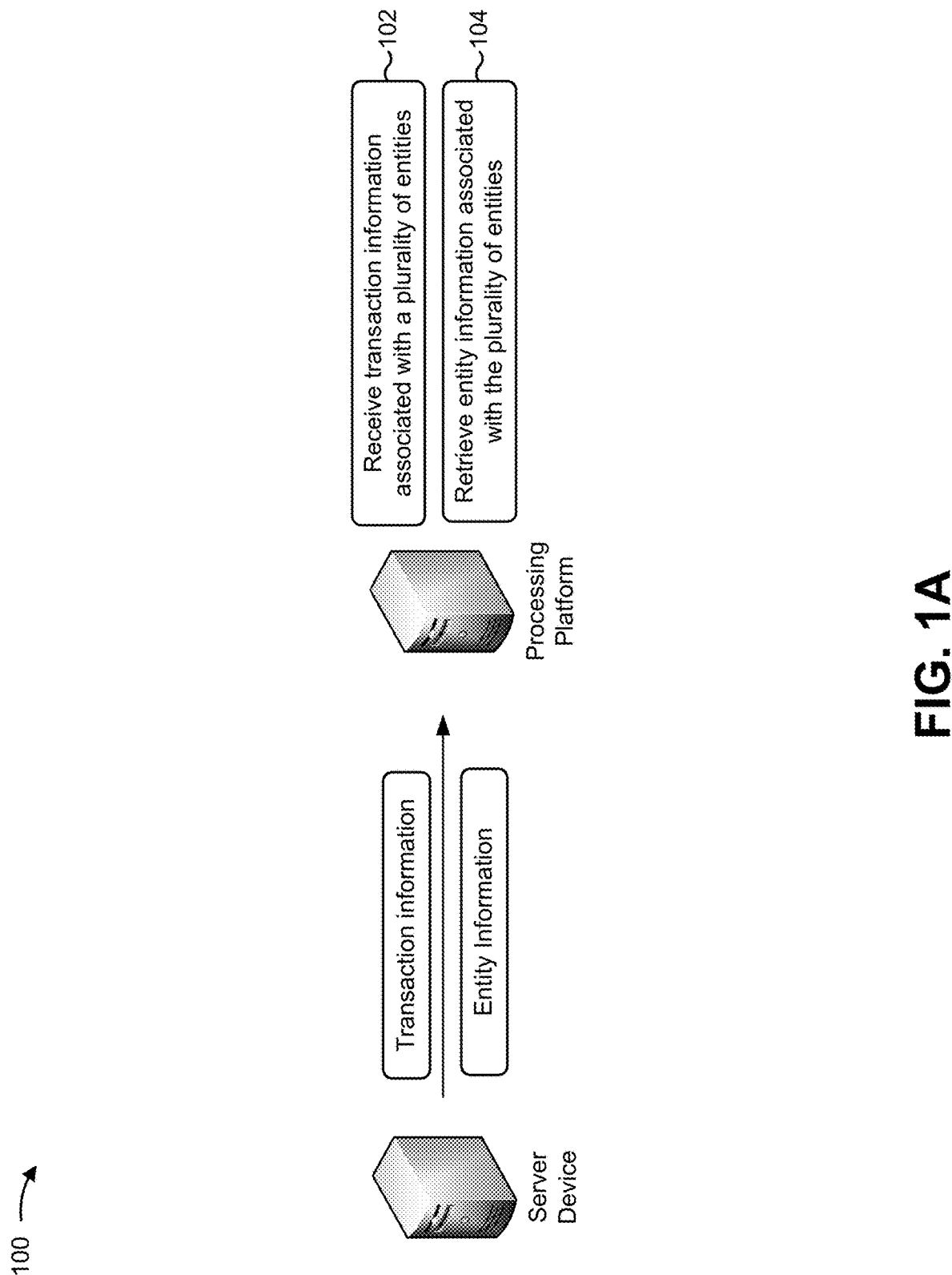
FIGS. 1A-1L are diagrams of one or more example implementations described herein.

The following detailed description of example implementations refers to the accompanying drawings. The same reference numbers in different drawings may identify the same or similar elements.

A person (sometimes referred to herein as an entity) may have a number of accounts of varying types. For example, a person may have one or more financial accounts (e.g., a personal banking account (e.g., a checking account, a savings account, and/or another type of personal banking account), an investment account (e.g., a retirement account, a brokerage account, a 529 account, and/or another type of investment account), and/or another type of financial account), one or more informational accounts (e.g., an account for accessing a web site of, or receiving informational articles from, an information source (e.g., a newspaper, a news channel, a weather channel, a blog, and/or another type of information source) and/or another type of informational account), one or more entertainment accounts (e.g., an account for viewing streaming media, an account for accessing electronic books, an account for accessing audio books, and/or another type of entertainment account), one or more social media accounts (e.g., a Facebook account, a Twitter account, a LinkedIn account, and/or another type of social media account), and/or one or more other types of accounts.

A set of related entities refers to a group of entities (e.g., people, businesses, and/or the like) that have entered into a type of relationship (e.g., a marriage, a legal union, a parent-child relationship, a partnership, a financial and/or business relationship, and/or another type of relationship).

When a person enters into a relationship with another person and becomes a set of related entities, each person may have numerous accounts of various types. It may be difficult for the people to determine which accounts to modify to form a joint account, whether to open a new account, whether to close an account, etc. As a result, accounts are sometimes poorly maintained when a group of people enter into a relationship.

The poor maintenance of accounts may result in account providers utilizing valuable computing resources (e.g., processor resources, memory resources, and/or the like) to maintain accounts that entities have stopped using, but have not closed. Account providers may utilize computer resources to determine suggested modifications to the accounts of the related entities. However, account providers may not be aware of what types of accounts the related entities have, a current financial situation of the related entities, and/or other information that may be useful for recommending modifications to the accounts of the related entities. As a result, the account providers may provide recommendations that are declined or ignored by the related entities thereby resulting in the waste of computing resources utilized to determine and/or provide the recommendations.

Some implementations described herein may train a first model using a dataset of transactions (e.g., financial transaction information, consumer transaction information, etc.), entity information associated with the transactions, and events, themes, or transaction parameters relating to the transactions. The first model may identify sets of related entities and types of relationships (e.g., a marriage relationship, a parent-child relationship, a business relationship, etc.) associated with the sets of related entities.

Some implementations described herein may train a second model using a data set of sets of related entities, types of relationships associated with the sets of related entities, and account information associated with the sets of related entities. The second model may identify modifications to a set of accounts associated with a set of related entities associated with a particular type of relationship. Some implementations described herein may perform a modification to the set of accounts associated with the set of related entities, may provide information identifying the modification to the set of accounts to one or more entities included in the set of entities, and/or the like.

In this way, an automated process may identify modifications to a set of accounts associated with a set of related entities using entity information and transaction information associated with an entity. The automated process may remove human subjectivity and waste from the process, which may improve speed and efficiency of the process and conserve computing resources (e.g., processor resources, memory resources, and/or the like). Furthermore, some implementations described herein use a rigorous, computerized process to perform tasks or activities that were not previously performed. For example, previously, there did not exist a technique to identify a set of related entities, a type of relationship associated with the set of related entities, and/or to identify modifications to a set of accounts associated with the set of related entities based on transaction information and entity information associated with an entity that performs the transactions. Accordingly, computing resources associated with manually identifying a set of related entities, a type of relationship associated with the set of related entities, and/or to identify modifications to a set of accounts associated with the set of related entities, as described herein, are conserved.

FIGS. 1A-1L are diagrams of one or more example implementations 100 described herein. As shown, implementation(s) 100 includes a server device and a processing platform. While the processing platform is shown as a device, in some implementations, the processing platform may be provided using a cloud computing environment, as described in more detail elsewhere herein.

In some implementations, the processing platform may obtain transaction information associated with a plurality of entities. For example, as shown in FIG. 1A, and by reference number 102, the processing platform may receive transaction information associated with a plurality of entities from a server device. As shown in FIG. 1A, the processing platform obtains transaction information from a single server device. However, the implementations described herein are not limited to those in which transaction information is received from a single server device. For example, the processing platform may receive transaction information from a plurality of server devices.

The transaction information may include information identifying or relating to transactions associated with the plurality of entities. For example, the transaction information may include information indicating a purchase (e.g., of an asset, such as a product, a house, land, etc., a service, and/or the like), information indicating a sale (e. g., of an asset), financial information associated with a purchase or a sale (e.g., information indicating an amount charged for an item and/or service, an account of an entity used for the purchase, an invoice identifier, a confirmation number, a transaction type, and/or the like), credit card transaction information, checking account transaction information, financial software information (e. g., information exported from an entity's financial software), and/or the like.

In some implementations, the processing platform may receive the transaction information from multiple, different sources (e. g., multiple accounts, multiple financial institutions, etc.). In some implementations, the processing platform may retrieve transaction information, such as by accessing a user account of an entity using credentials associated with the entity. In some implementations, the processing platform may receive the transaction information as a data stream. For example, the processing platform may receive transaction information as the transactions are performed or processed (e.g., hundreds of transactions, thousands of transactions, millions of transactions, etc.), and may perform the operations described herein in real time as the transactions are performed or processed. In such a case, the processing platform may index information regarding processed transaction information that can be used to identify selected sets of transactions, as described in more detail below. This may conserve storage or memory resources of the processing platform that would otherwise be used to store batches of transaction information.

In some implementations, the processing platform may perform natural language processing on the transaction information so that the transaction information is in a machine-readable format. For example, the processing platform may perform natural language processing on the transaction information to generate natural language processing results and may analyze the natural language processing results to identify information included in the transaction information. Natural language processing involves techniques performed (e. g., by a computer system such as, for example, the processing platform) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the processing platform may obtain entity information associated with the plurality of entities. For example, as shown in FIG. 1A, and by reference number 104, the processing platform may receive entity information associated with the plurality of entities from a server device. The entity information may include information associated with an entity, such as location information (e.g., an address of the entity, a jurisdiction in which the entity is located, locations associated with transactions associated with the entity, etc.), information identifying entities associated with the entity (e.g., a family member associated with the entity, a representative of the entity, an attorney of the entity, etc.), information identifying accounts associated with the entity (e.g., accounts associated with transaction information, etc.), communications associated with the entity (e. g., email messages, text messages, voice message transcriptions, etc.), membership information (e. g., identifying an organization of which the entity is a member), and/or the like.

In some implementations, the processing platform may receive the entity information based on a user input. For example, the entity or another user may input, via a user interface associated with the processing platform, the server device, a user device, and/or another device, at least part of the entity information or may provide input indicating whether entity information determined by the processing platform is accurate.

In some implementations, the processing platform may retrieve the entity information. For example, the processing platform may retrieve the entity information based on accessing an account associated with an entity using credentials associated with the entity (e. g., after gaining permission from the entity to access the account). In some implementations, the processing platform may receive the entity information as a data stream. For example, when the entity information relates to communications, the processing platform may receive the entity information as communications are performed and may perform the operations described herein in real time as the entity information is received. In such a case, the processing platform may index information determined based on the entity information, which may be used to identify sets of transactions and/or potential modifications to a set of accounts, as described in more detail elsewhere herein. Thus, storage or memory resources of the processing platform that would otherwise be used to store large datasets of entity information may be conserved.

In some implementations, the processing platform may obtain entity information associated with transaction information. For example, the processing platform may determine that a transaction, included in the transaction information is associated with a particular entity. The processing platform may retrieve a set of entity information associated with the particular entity based on the particular entity being associated with the transaction.

In some implementations, the processing platform may obtain the entity information based on a date associated with transaction information. For example, the processing platform may obtain entity information associated with a range of dates that matches a range of dates of the transaction information. As another example, the processing platform may identify a particular transaction (e.g., based on a size of the transaction, a dollar amount associated with the transaction, a counterparty of the transaction, a location associated with the transaction, and/or the like), and may obtain entity information pertinent to that transaction (e.g., entity information associated with an entity performing the transaction, communications associated with the particular transaction, etc.). Thus, the processing platform may identify particular entity information that is to be retrieved, thereby reducing the volume of entity information to be processed by the processing platform and conserving resources of the processing platform.

In some implementations, the processing platform may perform natural language processing on the entity information so that the entity information is in a machine-readable format. For example, the processing platform may perform natural language processing on the entity information to generate natural language processing results and may analyze the natural language processing results to identify information included in the entity information. Natural language processing involves techniques performed (e. g., by a computer system) to analyze, understand, and derive meaning from human language in a useful way. Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, the processing platform may determine a related set of entities and/or a type of relationship associated with the related set of entities (e.g., a marriage relationship, a legal union, a parent-child relationship, a legal guardianship, a partnership relationship, a business relationship, and/or another type of relationship) based on the transaction information and the entity information. For example, the processing platform may process the transaction information and/or the entity information to determine a related set of entities and a type of relationship associated with the related set of entities.

Figure 1B:
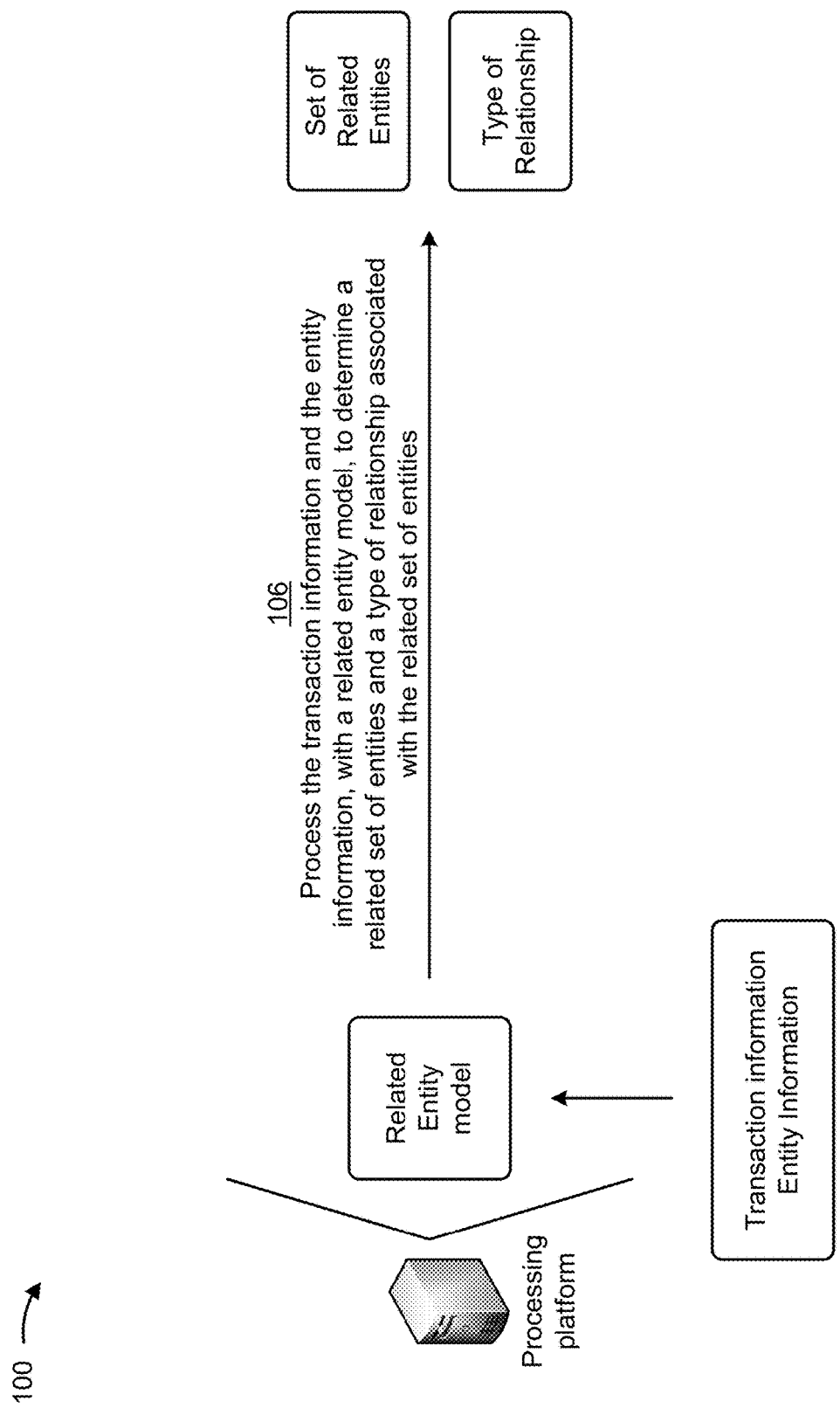

In some implementations, the processing platform may utilize machine learning to determine the related set of entities. For example, as shown in FIG. 1B, and by reference number 106, the processing platform may process the transaction information, the entity information, and/or information identifying an event, a theme, and/or a transaction parameter using a model, shown in FIG. 1B as a related entity model, to determine a related set of entities and a type of relationship associated with the related set of entities. In some implementations, the related entity model may be referred to as a first model. As described herein, the processing platform may use one or more artificial intelligence techniques, such as machine learning, deep learning, and/or the like to train the related entity model to determine the sets of related entities based on transaction information, entity information, event information, a theme, and/or a transaction parameter.

In some implementations, the transaction information may include information associated with a plurality of transactions associated with the plurality of entities. The processing platform may process the transaction information to determine an event (e.g., a wedding, an engagement party, a baby shower, a major purchase and/or sale (e.g., a purchase and/or sale of a house, an automobile, a purchase and/or sale exceeding a certain dollar amount, and/or another type of major purchase and/or sale), a theme (e.g., a transaction indicating an established relationship, a transaction indicating a formation of a relationship, a transaction indicating an entity is associated with a particular type of relationship (e.g., a marriage relationship, a parent-child relationship, a business relationship, and/or another type of relationship), and/or another type of theme), and/or a transaction parameter (e.g., an amount paid, an amount received, a date of the transaction, a time of the transaction, an entity conducting the transaction, an entity associated with, but not conducting, the transaction, and/or another type of transaction parameter) associated with each transaction. For example, the transaction information may include information identifying first transaction associated with a purchase of a wedding dress by a first entity. The processing platform may associate the first transaction and/or the first entity with an event (e.g., a life event, a wedding, and/or another event associated with a purchase of a wedding dress), a theme (e.g., marriage, legal union, and/or another theme associated with a purchase of a wedding dress), and/or a transaction parameter (e.g., a store at which the wedding dress was purchased, a price of the wedding dress, a range of prices that includes a price of the wedding dress, a date of the purchase, a time that the purchase was made, and/or another type of transaction parameter).

In some implementations, the processing platform may determine the set of related entities based on the event, the theme, and/or the transaction parameter associated with each transaction. For example, the processing platform may determine that a first entity and a second entity are both associated with one or more transactions associated with a particular event, a particular theme, and/or a particular transaction parameter. The processing platform may determine that the first entity and the second entity are, or are planning to be, related based on the first entity and the second entity both being associated with one or more transactions associated with the particular event, the particular theme, and/or the particular transaction parameter.

In some implementations, the processing platform may determine that the first entity and the second entity are, or are planning to be, related based on the entity information. For example, the processing platform may process the entity information to identify first entity information associated with the first entity and second entity information associated with the second entity. The processing platform may determine that the first entity and the second entity are, or are planning to be, related based on the first entity information and/or the second entity information.

In some implementations, the processing platform may determine whether the first entity information and/or the second entity information supports, or is consistent with, the determination that the first entity and the second entity are, or are planning to be, related. For example, the first entity information and/or the second entity information may include information indicating a marital status, an age, a location of a primary residence, an employment status, and/or another type of information suitable for determining whether the first entity information and/or the second entity information supports, or is consistent with, the determination that the first entity and the second entity are, or are planning to be, related.

Figure 1C:
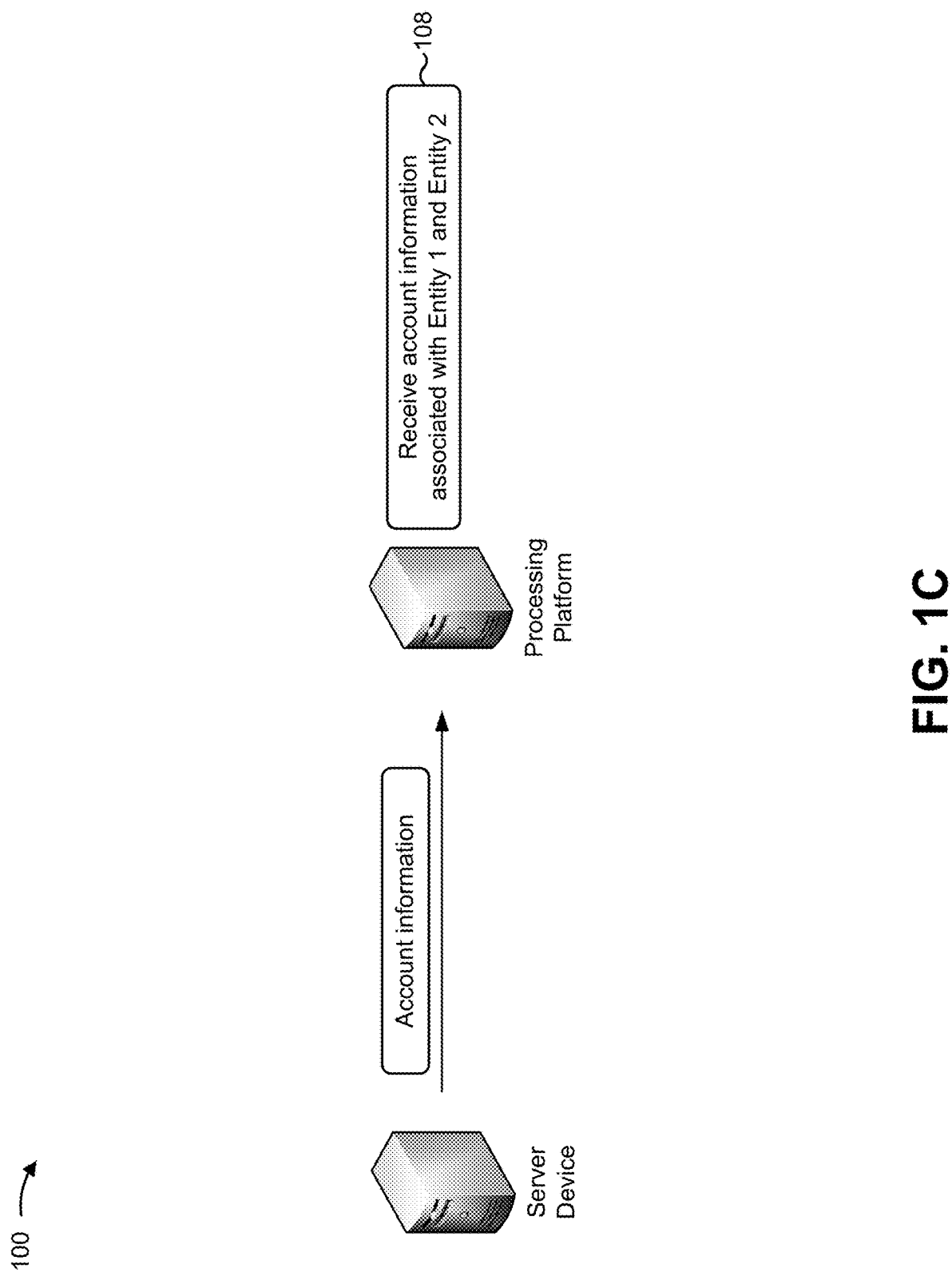

In some implementations, the processing platform may obtain account information associated with the set of related entities. For example, as shown in FIG. 1C, and by reference number 108, the processing platform may obtain account information associated with the related set of entities from a server device.

In some implementations, the account information may include information identifying a set of accounts associated with each individual entity included in the set of related entities. For example, the set of related entities may include a first entity and a second entity. The account information may include information identifying an account associated with the first entity and/or information identifying an account associated with the second entity.

In some implementations the account information may include information identifying a set of accounts associated with a plurality of entities included in the related set of entities. For example, the related set of entities may include a first entity, a second entity, and a third entity. The account information may include information identifying an account associated with the first entity and the second entity, information identifying an account associated with the first entity and the third entity, information identifying an account associated with the second entity and the third entity, and/or information identifying an account associated with the first entity, the second entity, and the third entity.

Figure 1D:
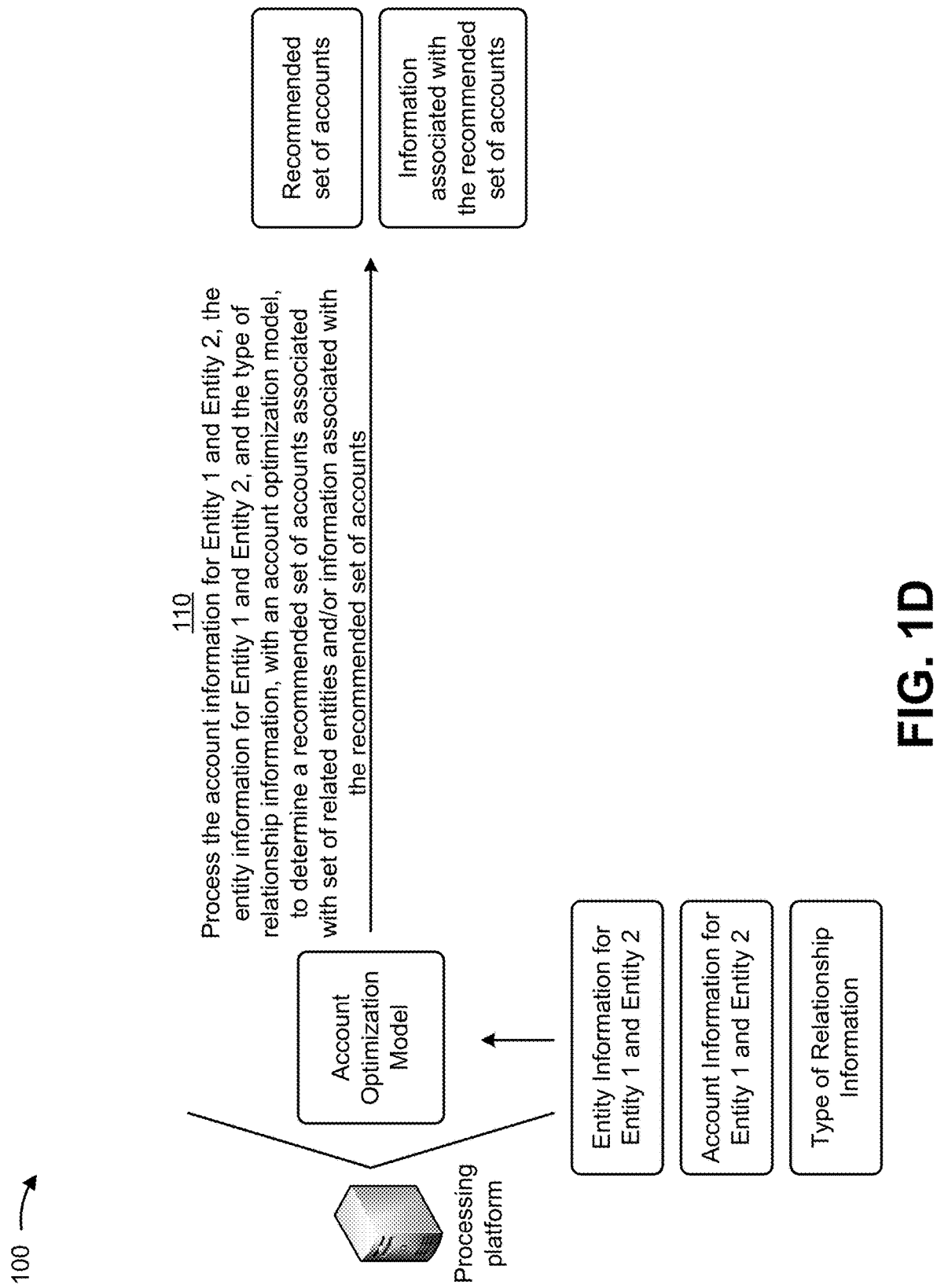

In some implementations, the processing platform may determine one or more modifications to the set of accounts associated with the set of related entities (e.g., one or more accounts to open for the set of related entities, one or more accounts, of the set of accounts associated with the set of related entities, to cancel, and/or one or more accounts, of the set of accounts associated with the set of related entities, to modify into a joint account) based on a recommended set of accounts. For example, as shown in FIG. 1D, and by reference number 110, the processing platform may process entity information associated with the related set of entities, account information associated with the related set of entities, and information identifying the type of relationship associated with the related set of entities, with a second model, shown in FIG. 1D as an account optimization model, to determine a recommended set of accounts for the set of related entities and/or information associated with the recommended set of accounts. The processing platform may determine one or more modifications to the set of accounts associated with the related set of entities based on the recommended set of accounts and/or the information associated with the recommended set of accounts. As described herein, the processing platform may use one or more artificial intelligence techniques, such as machine learning, deep learning, and/or the like to train the related entity model to determine a recommended set of accounts for the set of related entities and/or information associated with the recommended set of accounts.

In some implementations, the processing platform may determine the one or more accounts to open, the one or more accounts to cancel, and/or the one or more accounts to modify into a joint account based on an account characteristic (e.g., an interest rate, a minimum balance to be maintained, a fee, a rewards program, an outstanding balance, a credit limit, and/or another account characteristic). For example, the set of accounts associated with the set of related entities may include a first credit card account associated with a first entity, of the set of related entities, and a second credit card account associated with a second entity, of the set of related entities. The processing platform may determine that an interest rate associated with the first credit card account is lower than an interest rate associated with the second credit card account. The processing platform may determine to modify the first credit card account to form a joint account associated with the first entity and the second entity and/or to close the second credit card account based on the interest rate associated with the first credit card account being lower than the interest rate associated with the second credit card account.

In some implementations, the processing platform may determine the one or more accounts to open, the one or more accounts to cancel, and/or the one or more accounts to modify into a joint account based on a socioeconomic factor (e.g., income, education, occupation, net worth, credit score, and/or another socioeconomic factor) associated with one or more entities included in the set of related entities. For example, the processing platform may determine sets of accounts associated with other sets of related entities associated with the same type of relationship and/or having a similar or corresponding socioeconomic factor as the set of related entities. The processing platform may determine the one or more accounts to open, the one or more accounts to cancel, and/or the one or more accounts to modify into a joint account based on the sets of accounts associated with the other sets of related entities.

In some implementations, the processing platform may determine a recommended set of accounts based on the sets of accounts associated with the other sets of related entities. For example, the processing platform may identify a type of account (e.g., savings, checking, brokerage, and/or another type of account) associated with each account included in the sets of accounts associated with the other sets of related entities. For each type of account identified, the processing platform may determine a commonality factor associated with the type of account. The commonality factor may represent a quantity and/or a percentage of sets of accounts associated with the other sets of related entities having that type of account. The processing platform may determine to include the type of account in the recommended set of accounts based on the commonality factor. In some implementations, the processing platform may compare the commonality factor, the quantity, and/or the percentage to a threshold commonality factor, a threshold quantity, and/or a threshold percentage. The processing platform may determine to include the type of account in the recommended set of accounts when commonality factor, the quantity, and/or the percentage is greater than, or equal to, the threshold commonality factor, the threshold quantity, and/or the threshold percentage.

The processing platform may determine the one or more accounts to open, the one or more accounts to cancel, and/or the one or more accounts to modify into a joint account based on the recommended set of accounts. For example, the processing platform may compare the set of accounts associated with the set of related entities to the recommended set of accounts. The processing platform may determine that the set of accounts associated with the set of related entities does not include a type of account included in the recommended set of accounts. In some implementations, the processing platform may determine to open the type of account included in the recommended set of accounts based on the set of accounts associated with the set of related entities not including the type of account. For example, the type of account may be a brokerage account. The processing platform may determine to open a brokerage account for the set of related entities based on the brokerage account being included in the recommended set of accounts.

In some implementations, the processing platform may determine to close an account included in the set of accounts associated with the related set of entities. For example, the set of accounts associated with the related set of entities may include a type of account that is not included in the recommended set of accounts. The processing platform may determine to close the type of account based on the type of account not being included in the recommended set of accounts. As another example, the set of accounts associated with the related set of entities may include multiple, individual video streaming accounts with the same video streaming provider. The processing platform may determine to close one or more of the multiple, individual video streaming accounts based on the multiple, individual video streaming accounts being with the same provider.

In some implementations, the processing platform may determine to modify an account included in the set of accounts associated with the related entities to form a joint account. For example, the processing platform may determine that the set of accounts associated with the related entities includes a type (e.g., a savings account, a checking account, a brokerage account, and/or another type of account) of individual account (e.g., an account associated with only one entity of the set of related entities). The processing platform may determine that the recommended set of accounts includes a joint account (e.g., an account associated with two or more entities of the set of related entities) of the same type. The processing platform may determine to modify the individual account to form a joint account based on the recommended set of accounts including the joint account of the same type.

Figure 1E:
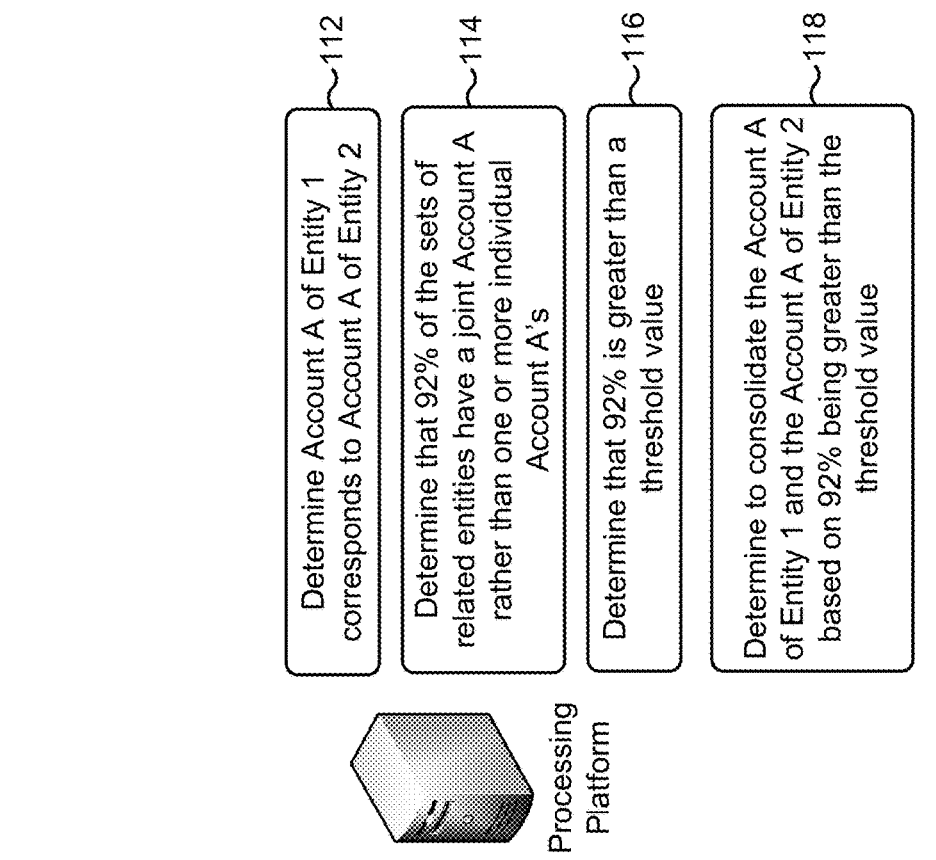
Figure 1E:
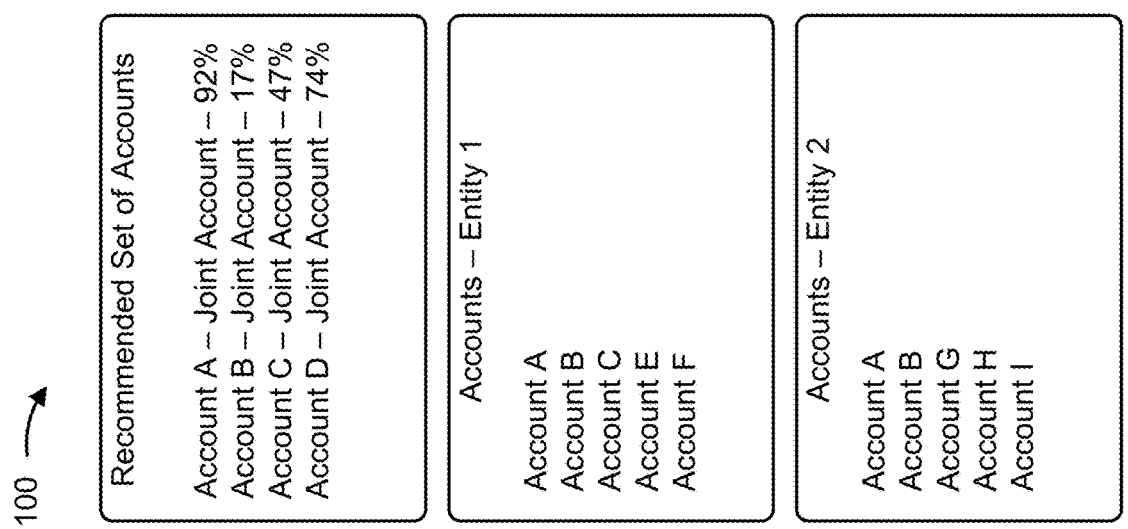

In some implementations, as shown in FIG. 1E, the recommended set of accounts may include one or more accounts associated with other sets of related entities that are associated with the type of relationship associated with the set of related entities and/or one or more socioeconomic factors associated with the set of related entities. For example, the set of related entities may include a first entity married to a second entity. The first and second entities may have ages within a particular range of ages (e.g., 21-25 years old, 26-30 years old, 31-35 years old, over the age of 50, and/or the like), may be of a particular ethnicity, may live in a particular geographic region, may have an annual income within a particular range of annual incomes (e.g., $10,000-$50,000, $50,000-$100,000, over $100,000, and/or the like), may have a total and/or individual net worth within a particular range of net worth values (e.g., $10,000-$50,000, $50,000-$100,000, over $100,000, and/or the like), and/or another socioeconomic factor.

The processing platform may identify other sets of related entities that are married, have ages within the particular range of ages, are of the particular ethnicity, live in a particular geographic region, have an annual income within the particular range of annual incomes, and/or have a total and/or individual net worth within the particular range of net worth values. The processing platform may determine a set of accounts associated with each set of related entities included in the other sets of related entities. The processing platform may determine the recommended set of accounts based on the set of accounts associated with each set of related entities included in the other sets of related entities.

In some implementations, the recommended set of accounts may include an account corresponding to each type and/or category of account included in the sets of accounts associated with the other sets of related entities. For example, the processing platform may determine that the sets of accounts associated with the other sets of related entities includes one or more savings accounts, one or more checking accounts, one or more brokerage accounts, one or more retirement accounts, and one or more video streaming service account associated with a particular video streaming service provider. The processing platform may generate the recommended set of accounts to include a savings account, a checking account, a brokerage account, a retirement account, and a video streaming service account associated with the particular video streaming service provider.

In some implementations, the recommended set of accounts may include accounts corresponding to a type and/or category of account occurring in a particular quantity and/or percentage of accounts included in the sets of accounts associated with the other sets of related entities. For example, the processing platform may determine a quantity of accounts that include a savings account. The processing platform may determine whether the quantity of accounts is greater than a threshold quantity. The processing platform may include a savings account in the recommended set of accounts when the quantity of accounts is greater than the threshold quantity.

In some implementations, as shown in FIG. 1E, the information associated with the recommended set of accounts may include, for each account included in the recommended set of accounts, information indicating a percentage of the other sets of related entities for which the account is a joint account (e.g., associated with at least two related entities) rather than an individual account (e.g., associated with only one entity). For example, the processing platform may determine a quantity of accounts that include a checking account. The processing platform may determine a percentage of the checking accounts that are joint checking accounts and/or a percentage of the checking accounts that are individual checking accounts. The information associated with the recommended set of accounts may include the percentage of the checking accounts that are joint checking accounts and/or the percentage of the checking accounts that are individual checking accounts.

In some implementations, the processing platform may determine that the related set of entities are associated with corresponding accounts. The corresponding accounts may be an account of a particular type and/or category and/or associated with a particular account provider (e.g., a savings account, a checking account, an entertainment account, a credit card account associated with a particular financial institution, and/or the like) associated with a first entity of the set of related entities and an account of the same type and/or category and/or associated with the same account provider associated with a second entity of the set of related entities.

For example, as shown in FIG. 1E, the account information associated with the first entity may include information identifying a first set of accounts associated with the first entity. The account information associated with the second entity may include information identifying a second set of accounts associated with the second entity. As shown in FIG. 1E, and by reference number 112, the processing platform may determine that an account associated with the first entity (shown in FIG. 1E as Account A) corresponds to an account associated with the second entity (also shown in FIG. 1E as Account A).

In some implementations, the processing platform may determine that the account associated with the first entity corresponds to the account associated with the second entity based on a comparison. For example, the processing platform may compare information associated with the first set of accounts and information associated with the second set of accounts. The processing platform may determine that the first and second entities are associated with corresponding accounts based on the comparison.

In some implementations, the processing platform may compare identifiers associated with each account in the first set of accounts and identifiers associated with each account in the second set of accounts. For example, the information associated with the first set of accounts may include a first identifier associated with a first account included in the first set of accounts. The first identifier may indicate a type or category of account (e.g., banking, savings, checking, entertainment, streaming media service account, news, current events, social media, and/or another type and/or category of account) associated with the first account. The processing platform may compare the first identifier and a second identifier associated with a second account included in the second set of accounts. The processing platform may determine that the first and second accounts are corresponding accounts based on comparing the first identifier and the second identifier.

Alternatively, and/or additionally, the processing platform may compare another type of information included in the information associated with the first set of accounts and/or the information associated with the second set of accounts such as, for example, a name of a service provider associated with the account, a name of a financial institution associated with the account, a type and/or category of a transaction associated with the account (e.g., a deposit, a withdrawal, a payment, and/or another type and/or category of a transaction), and/or another type of information useful in determining whether the account corresponds to an account associated with a related entity.

In some implementations, the processing platform may determine whether to consolidate one or more of the corresponding accounts. For example, as shown in FIG. 1E, the processing platform may determine to consolidate Account A of Entity 1 and Account A of Entity 2 based on determining that Account A of Entity 1 corresponds to Account A of Entity 2.

In some implementations, the processing platform may determine whether to consolidate one or more of the corresponding accounts based on the recommended set of accounts and/or the information associated with the recommended set of accounts. For example, the recommended set of accounts may include an Account A and the information associated with the recommended set of accounts may indicate a quantity and/or a percentage of sets of related entities, included in the other sets of related entities, having a joint Account A rather than one or more individual Account A's. As shown in FIG. 1E, and by reference number 114, the processing platform may determine a percentage of the sets of related entities, having a joint Account A based on the information associated with the recommended set of accounts.

As shown in FIG. 1E, and by reference number 116, the processing platform may determine that the percentage of sets of related entities is greater than a threshold percentage. The processing platform may determine to consolidate the Account A of the first entity and the Account A of the second entity based on the percentage of sets of related entities being greater than the threshold percentage. In some implementations, as shown in FIG. 1E, and by reference number 118, the processing platform may determine to consolidate the corresponding accounts based on the percentage of the sets of related entities being greater than the threshold percentage.

In some implementations, the processing platform may consolidate the corresponding accounts by modifying one or more accounts of the corresponding accounts to form a joint account associated with at least two entities included in the set of related entities. For example, the processing platform may modify the Account A associated with the first entity to form a joint account associated with the first entity and the second entity.

In some implementations, the processing platform may select the one or more accounts to be modified based on an entity characteristic associated with an entity included in the set of related entities. The entity characteristic may include a credit score of the entity, a net worth of the entity, an age of the entity, and/or another characteristic associated with an entity that may be useful in selecting an account to be modified to form a joint account. For example, the processing platform may determine a credit score associated with the first entity and a credit score associated with the second entity based on the entity information associated with the first entity and the entity associated with the second entity, respectively. The processing platform may determine that the credit score associated with the first entity is higher than the credit score associated with the second entity. The processing platform may select the Account A associated with the first entity as the account to be modified to form the joint account (rather than the Account A associated with the second entity) based on the credit score associated with the first entity being higher than the credit score associated with the second entity.

Alternatively, and/or additionally, the processing platform may select the one or more accounts to be modified based on an account characteristic associated with one of the corresponding accounts. The account characteristic may include an interest rate associated with one of the corresponding accounts, a rewards program associated with one of the corresponding accounts, a rating associated with a service provider (e.g., a consumer satisfaction rating, a reliability rating, and/or another type of rating) associated with one of the corresponding accounts, a value of an asset associated with one of the corresponding accounts, a value of a liability associated with one of the corresponding accounts, and/or another characteristic associated with an account that may be useful in selecting an account to be modified to form a joint account. For example, the Account A associated with the first entity and the Account A associated with the second entity may be savings accounts. The processing platform may determine an interest rate associated with the Account A associated with the first entity and an interest rate associated with the Account A associated with the second entity based on the account information associated with the first entity and the account information associated with the second entity, respectively. The processing platform may determine that the interest rate associated with the Account A associated with the first entity is higher than the interest rate associated with the Account A associated with the second entity. The processing platform may select the Account A associated with the first entity as the account to be modified to form the joint account (rather than the Account A associated with the second entity) based on the interest rate associated with the Account A associated with the first entity being higher than the interest rate associated with the Account A associated with the second entity.

In some implementations, the processing platform may determine to cancel one or more of the corresponding accounts based on determining to modify another one or more of the corresponding accounts. For example, the processing platform may determine to modify the Account A associated with the first entity to form a joint account associated with the first entity and the second entity. The processing platform may determine to cancel the Account A associated with the second entity based on modifying the Account A associated with the first entity to form the joint account. To cancel the Account A of the second entity, the processing platform may send instructions to a server, associated with the Account A of the second entity, to cancel the account.

Figure 1F:
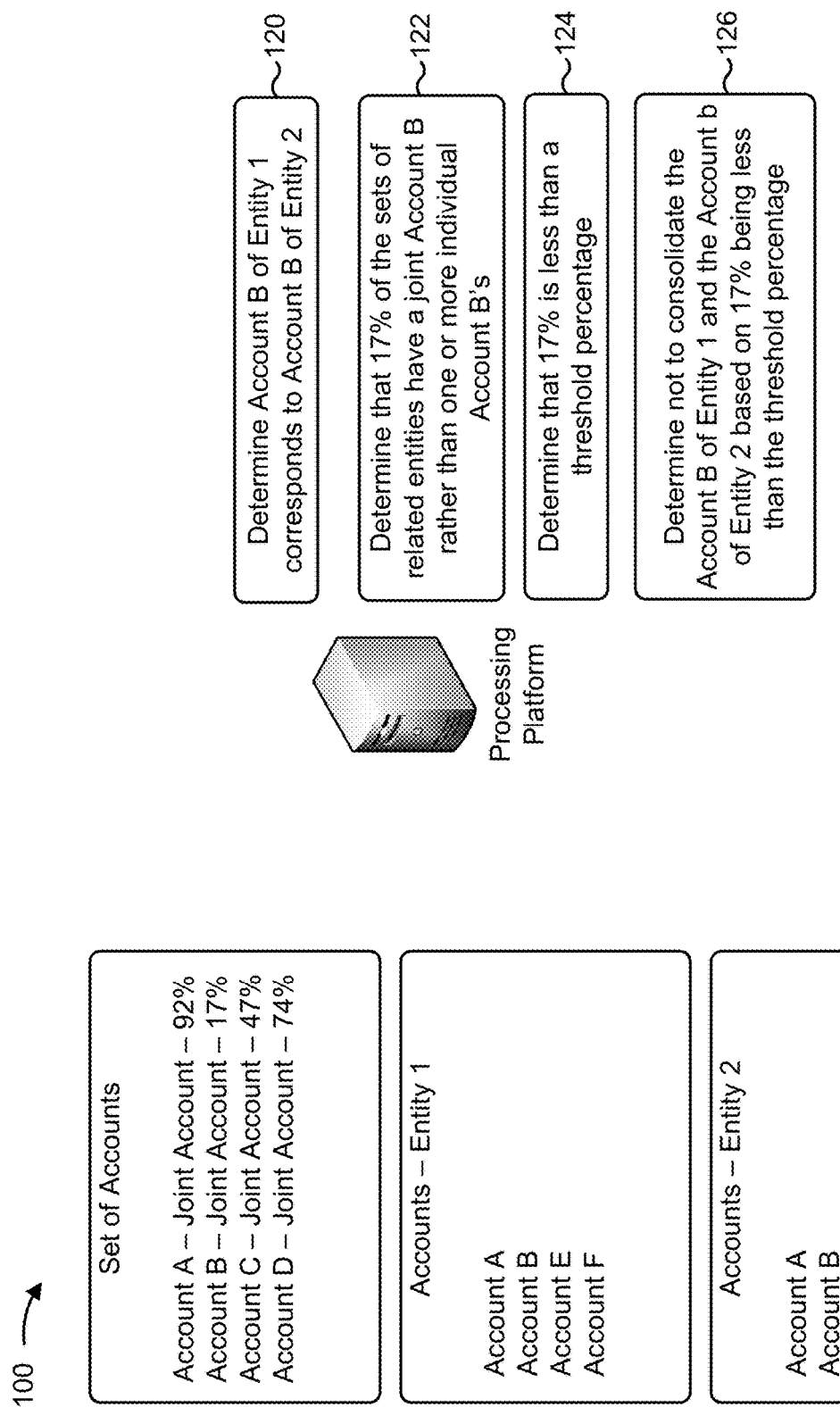

In some implementations, the processing platform may determine not to consolidate corresponding accounts. For example, as shown in FIG. 1F, and by reference number 120, the processing platform may determine that Account B of entity 1 corresponds to Account B of entity 1. In some implementations, the processing platform may determine that Account B of entity 1 corresponds to Account B of entity 1 in a manner similar to that described above with respect to FIG. 1E.

As shown in FIG. 1F, and by reference number 122, the processing platform may determine a percentage of the sets of related entities, included in the other sets of related entities having a joint Account B rather than one or more individual Account B's (shown in FIG. 1F as 17%) based on the information associated with the set of accounts associated with the other sets of related entities.

As shown in FIG. 1F, and by reference number 124, the processing platform may determine that the percentage of the sets of related entities is less than a threshold percentage. As shown in FIG. 1F, and by reference number 126, the processing platform may determine not to consolidate the Account B of the first entity and the Account by of the second entity based on the percentage of the sets of related entities having a joint account B being less than the threshold percentage.

In some implementations, the processing platform may determine to consolidate one or more accounts associated with the set of related entities based on a quantity of accounts. For example, the processing platform may determine to consolidate one or more accounts associated with the set of related entities based on a quantity of accounts associated with a particular type and/or category of account being greater than a threshold quantity of accounts associated with the particular type and/or category of account.

In some implementations, the processing platform may form subsets of accounts based on a type and/or category associated with each account associated with the first entity and/or the second entity. For example, as shown in FIG. 1G, the processing platform may determine a category associated with each account associated with the first entity and a category associated with each account associated with the second entity.

Figure 1G:
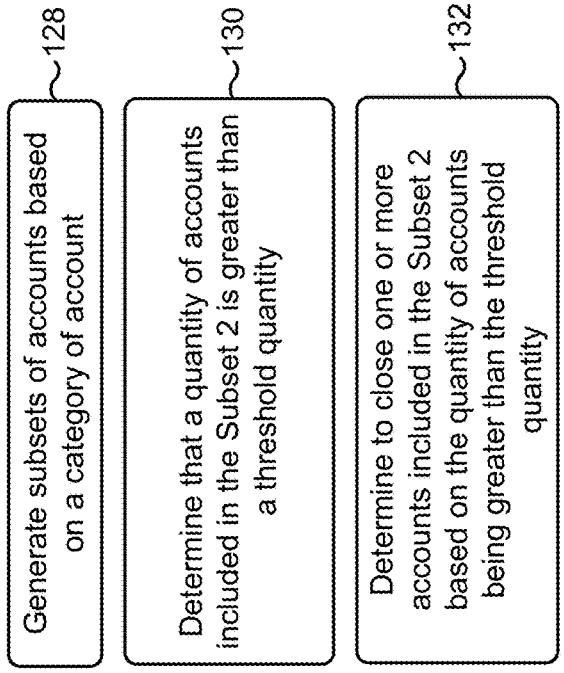

As shown in FIG. 1G, and by reference number 128, the processing platform may generate subsets of accounts based on the category. For example, the processing platform may generate the subsets of accounts by grouping accounts associated with the same type and/or category into discrete subsets of accounts.

In some implementations, each category may be associated with a threshold quantity. The threshold quantity may be based on a quantity of accounts associated with each category that are included in the sets of accounts associated with other sets of related entities associated with the type of relationship associated with the set of related entities. For example, the other sets of related entities may include a first set of related entities and a second set of related entities. The processing platform may determine that the first set of related entities is associated with 3 entertainment accounts (e.g., an Audible® account, a Netflix® account, and a Hulu® account) and that the second set of related entities is associated with 5 entertainment accounts (e.g., two Audible® accounts, a Netflix® account, a Hulu® account, and a Roku® account). The processing platform may determine a threshold quantity associated with the particular category based on the first quantity (e.g., 3) and/or the second quantity (e.g., 5). In some implementations, the threshold quantity may be the average of the first quantity and the second quantity (e.g., 4), the greater of the first quantity and the second quantity (e.g., 5), or the lesser of the first quantity and the second quantity (e.g., 3).

Alternatively, and/or additionally, the threshold quantity may be determined in another manner such as a frequency of a quantity of accounts associated with the particular category. For example, the processing platform may determine that a majority of the other sets of related entities have 4 entertainment accounts. The processing platform may determine the threshold quantity is 4 based on the majority of the other sets of related entities having 4 entertainment accounts.

In some implementations, the processing platform may determine that a quantity of accounts, included in a subset of accounts, is greater than a threshold quantity. For example, as shown in FIG. 1G, and by reference number 130, the processing platform may determine that a quantity of accounts included in Subset 2 is greater than a threshold quantity associated with a category associated with Subset 2 (e.g., Streaming Services, as shown in FIG. 1G). As shown in FIG. 1G, and by reference number 132, the processing platform may determine to close one or more accounts included in the subset of accounts based on the quantity of accounts being greater than the threshold quantity.

Figure 1H:
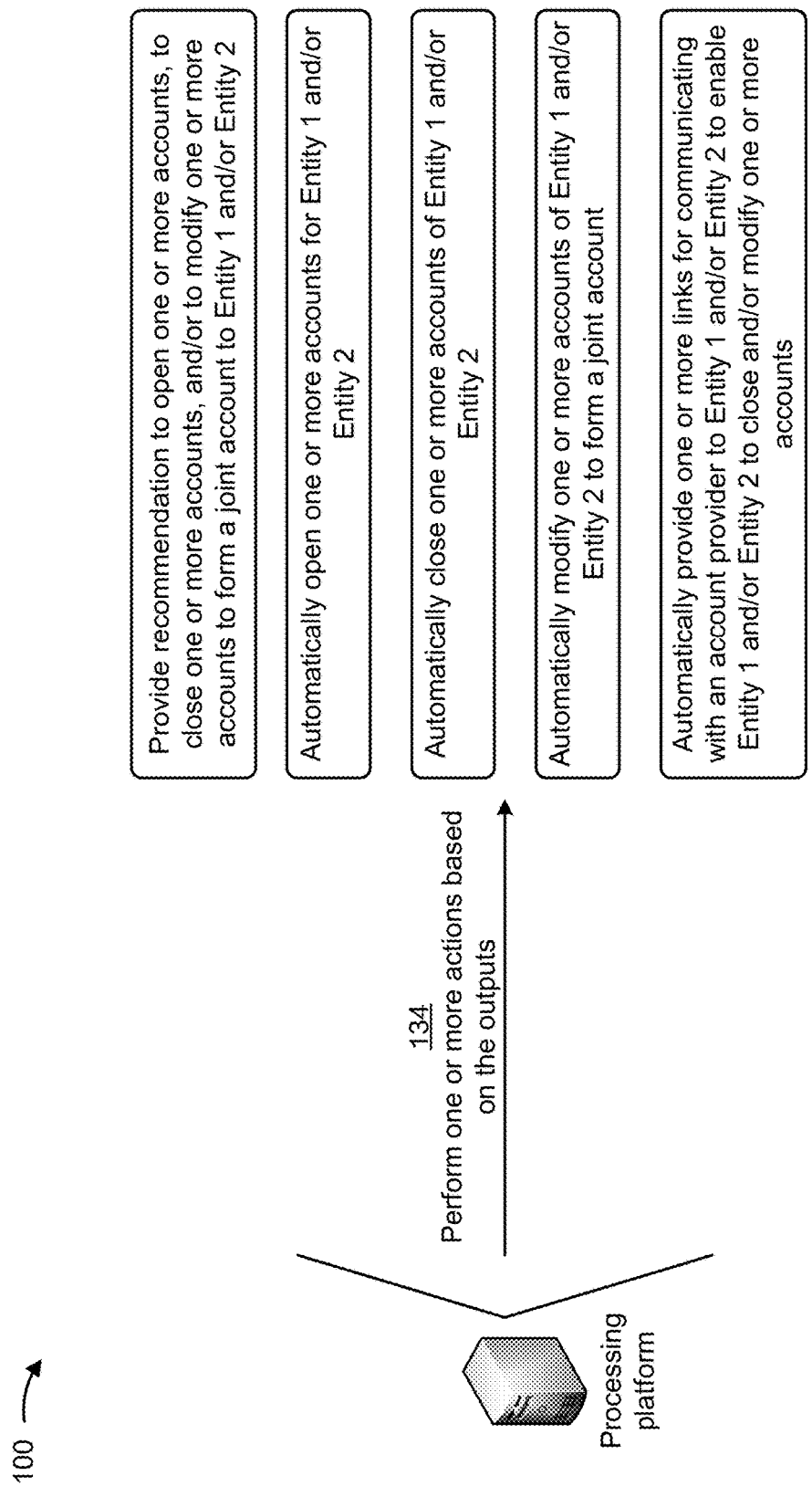

In some implementations, as shown in FIG. 1H, and by reference number 134, the processing platform may perform one or more actions based on determining to modify and/or close one or more accounts associated with the set of related entities.

In some implementations, the one or more actions may include providing a recommendation to close one or more accounts and/or to modify one or more accounts to form a joint account to one or more entities included in the set of related entities, receiving a response to the recommendation, and/or performing an action based on the response. For example, the processing platform may generate a recommendation to close one or more accounts and/or to modify one or more accounts to form a joint based on determining that an account associated with one of the entities, of the set of related entities, corresponds to an account associated with another one of the entities, of the set of related entities. The processing platform may transmit the recommendation to one or more user devices associated with the set of related entities. The processing platform may receive a response from the set of related entities (e.g., from the one or more user devices associated with the set of related entities). The response may indicate that the processing platform is to close the one or more accounts and/or modify the one or more accounts. The processing platform may close the one or more accounts and/or modify the one or more accounts based on the response.

In some implementations, the one or more actions may include automatically providing a link (e.g., a uniform resource locator (URL)) for communicating with (e.g., via a telephone call, an email message, an Instant Message, a text message, and/or the like) an account provider to one or more user devices associated with the set of related entities. For example, the recommendation may include a link for establishing a telephone call with an account provider associated with the one or more accounts recommended to be closed and/or a link for establishing a telephone call with an account provider associated with the one or more accounts recommended to be modified to form the one or more joint accounts.

Alternatively, and/or additionally, the action performed based on the response may include providing the link for establishing the telephone call with the account provider associated with the one or more accounts recommended to be closed and/or the link for establishing the telephone call with an account provider associated with the one or more accounts recommended to be modified to form the one or more joint accounts. For example, the response may indicate that the set of related entities will close the one or more accounts recommended to be closed and/or will modify the one or more accounts recommended to be modified to form the one or more joint accounts. The processing platform may provide the link for establishing the telephone call with the account provider associated with the one or more accounts recommended to be closed and/or the link for establishing the telephone call with an account provider associated with the one or more accounts recommended to be modified to form the one or more joint accounts to one or more user devices associated with the set of related entities based on the response.

In some implementations, the recommendation may include information identifying a subset of accounts associated with a particular category and/or a recommendation to close and/or modify one or more accounts included in the subset of accounts and the response may include information identifying a first group of one or more accounts included in the subset of accounts that are to be closed and/or information identifying a second group of one or more accounts included in the subset of accounts to modified to form one or more joint accounts. In these implementations, the action performed based on the response may include closing the first group of accounts and/or modifying the second group of accounts to form the one or more joint accounts.

In some implementations, the one or more actions may include automatically closing one or more accounts associated with the set of related entities and/or automatically modifying one or more accounts associated with the set of related entities to form one or more joint accounts. For example, continuing with the example discussed above with respect to FIG. 1E, the processing platform may determine to consolidate the Account A of entity 1 and the Account A of entity 2 based on the percentage of the sets of related entities having a joint Account A is greater than a first threshold percentage.

The processing platform may determine whether the percentage of the sets of related entities having a joint Account A is greater than a second threshold percentage based on the percentage of the sets of related entities having a joint Account A being greater than the first threshold percentage. The second threshold percentage may be greater than the first threshold percentage and may be associated with automatically performing an action. The processing platform may determine to automatically consolidate the Account A associated with the first entity and the Account A associated with the second entity by modifying the Account A associated with the first entity to form a joint account and closing the Account A associated with the second entity based on the percentage of the sets of related entity having a joint Account A being greater than the second threshold percentage.

In some implementations, the processing platform may determine an occurrence of a life event (e.g., a birth of a child, an adoption of a child, a death of a family member, a high school graduation, a college graduation, an event associated with an end to the relationship between the set of related entities (e.g., a divorce, a death of one of the entities, a dissolution of a business, and/or another type of event associated with an end to the relationship between the set of related entities), and/or another type of life event) associated with the set of related entities.

Figure 1I:
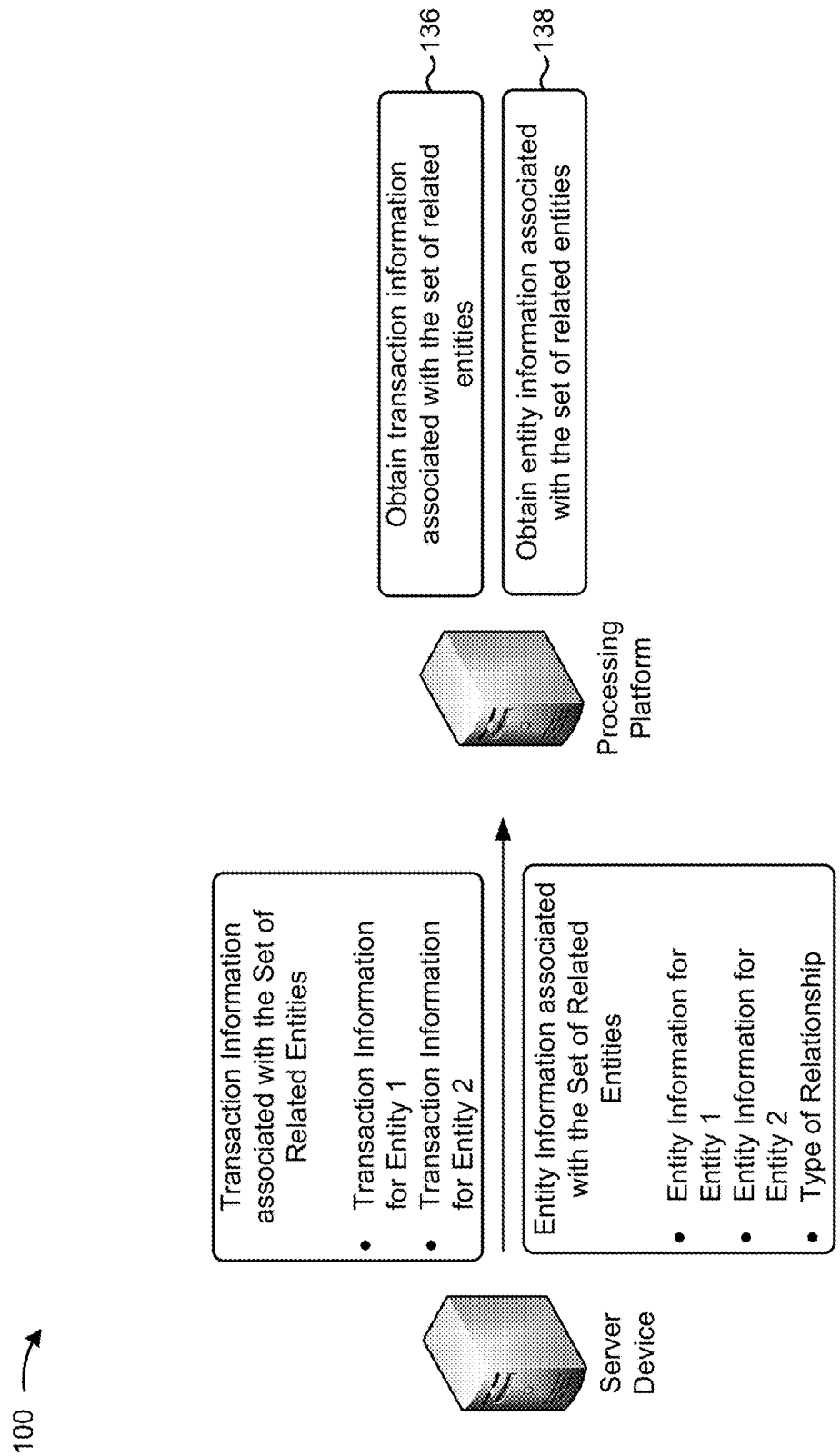

In some implementations, the processing platform may determine the occurrence of the life event based on transaction information and/or entity information associated with the set of related entities. For example, as shown in FIG. 1I, and by reference numbers 136 and 138, the processing platform may obtain transaction information and entity information associated with the set of related entities from a server device.

The transaction information associated with the set of related entities may include transaction information associated with one or more of the entities included in the set of related entities. For example, as shown in FIG. 1I, the transaction information associated with the set of related entities includes transaction information associated with a first entity (shown as Entity 1) and transaction information associated with a second entity (shown as Entity 2) of the set of related entities.

The entity information associated with the set of related entities may include entity information associated with one or more of the entities included in the set of related entities and/or information identifying the type of relationship associated with the set of related entities. For example, as shown in FIG. 1I, the entity information associated with the set of related entities may include entity information associated with the first entity, entity information associated with the second entity, and information identifying the type of relationship associated with the set of related entities.

In some implementations, the processing platform may obtain the entity information associated with the set of related entities based on the transaction information. For example, the processing platform may analyze the transaction information that a first transaction was conducted by the first entity and that a second transaction was conducted by the second entity. The processing device may obtain the entity information associated with the first entity based on the first transaction being conducted by the first entity. The processing platform may obtain the entity information associated with the second entity based on the second transaction being conducted by the second entity.

Figure 1J:
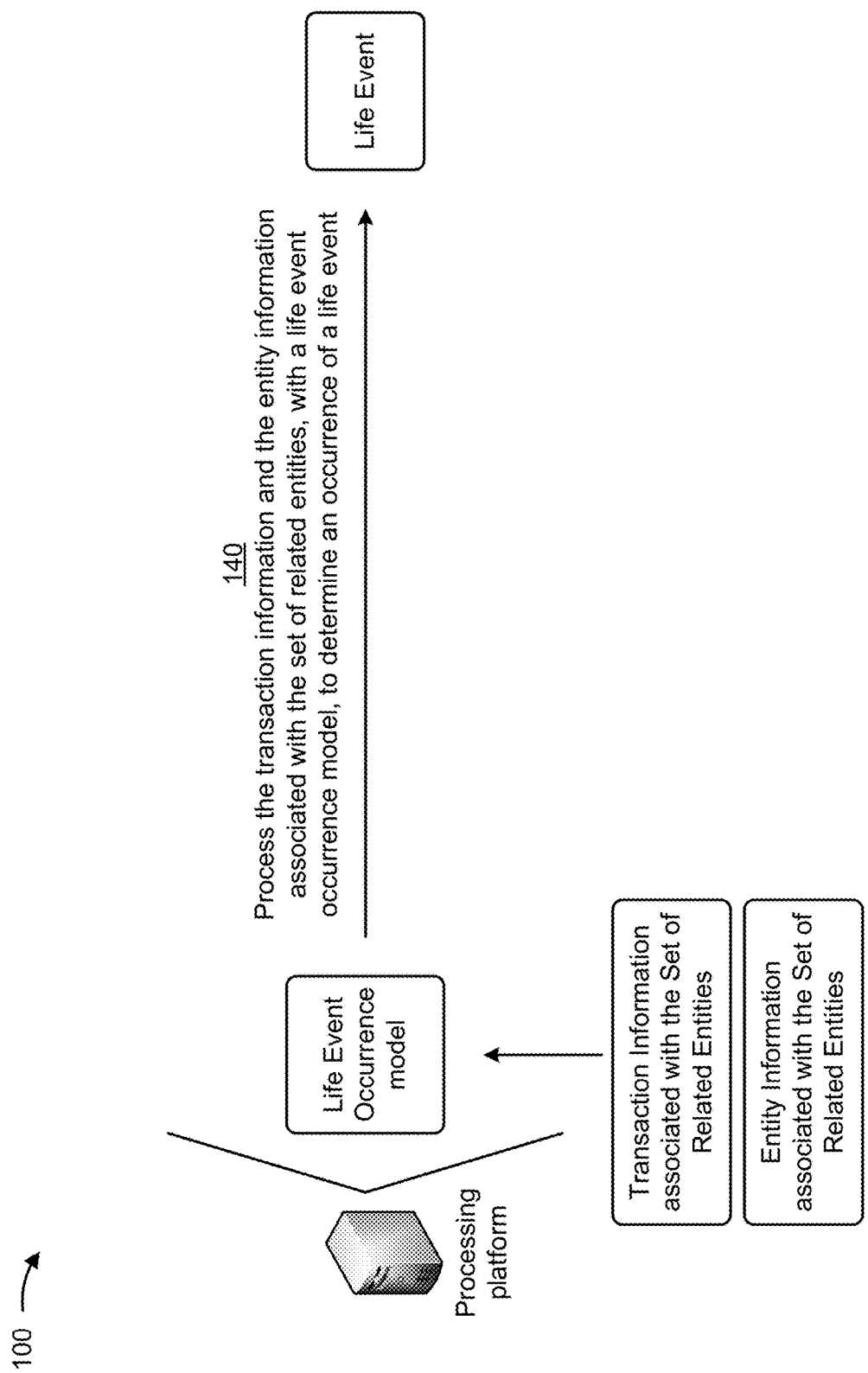

In some implementations, as shown in FIG. 1J, and by reference number 140, the processing platform may process the transaction information, the entity information, and information identifying the type of relationship associated with the set of related entities, with a third model, shown in FIG. 1J as a life event occurrence model, to determine the occurrence of the life event. As described herein, the processing platform may use one or more artificial intelligence techniques, such as machine learning, deep learning, and/or the like to train the related entity model to determine the occurrence of the life event.

In some implementations, the processing platform may determine a set of life events associated with sets of related entities associated with the type of relationship associated with the set of related entities. For example, the processing platform may determine that the type of relationship (e.g., married) and one or more socioeconomic factors associated with the set of related entities. The processing platform may determine a set of life events associated with the set of related entities based on the type of relationship and the one or more socioeconomic factors.

In some implementations, the processing platform may determine the set of life events based on sets of related entities associated with the same type of relationship and/or associated with the same, or similar, socioeconomic factors as the set of related entities. For example, the processing platform may identify sets of related entities associated with the same type of relationship and/or the one or more socioeconomic factors associated with the set of related entities. The processing platform may analyze entity information associated with the identified sets of related entities to determine one or more life events experienced by, or associated with, the identified sets of related entities. The processing platform may determine the set of life events associated with the set of related entities based on the one or more life events experienced by, or associated with, the identified sets of related entities.

In some implementations, the processing platform may determine the set of life events associated with the set of related entities based on a quantity and/or a percentage of the identified sets of related entities having experienced a particular life event. For example, the processing platform may determine whether a quantity and/or a percentage of the identified sets of related entities that have experienced the particular life event is greater than, or equal to, a threshold quantity and/or a threshold percentage. The processing platform may include the particular life event in the set of life events associated with the set of related entities when the quantity and/or the percentage of the identified sets of related entities that have experienced the particular life event is greater than, or equal to, the threshold quantity and/or the threshold percentage.

In some implementations, the processing platform may include each life event experienced by the identified sets of related entities in the set of life events associated with the set of related entities. For example, the processing platform may determine that a quantity of sets of related entities, included in the identified sets of related entities is less than a threshold quantity. The processing platform may include each life event experienced by the identified sets of related entities in the set of life events associated with the set of related entities based on the quantity of the sets of related entities being less than the threshold quantity.

In some implementations, the processing platform may determine the occurrence of the life event based on the set of life events. For example, the processing platform may determine that one or more transactions included in the transaction information associated with the set of related entities are associated with a particular life event included in the set of life events. The processing platform may determine the occurrence of the particular life event based on the one or more transactions being associated with the particular life event.

Figure 1K:
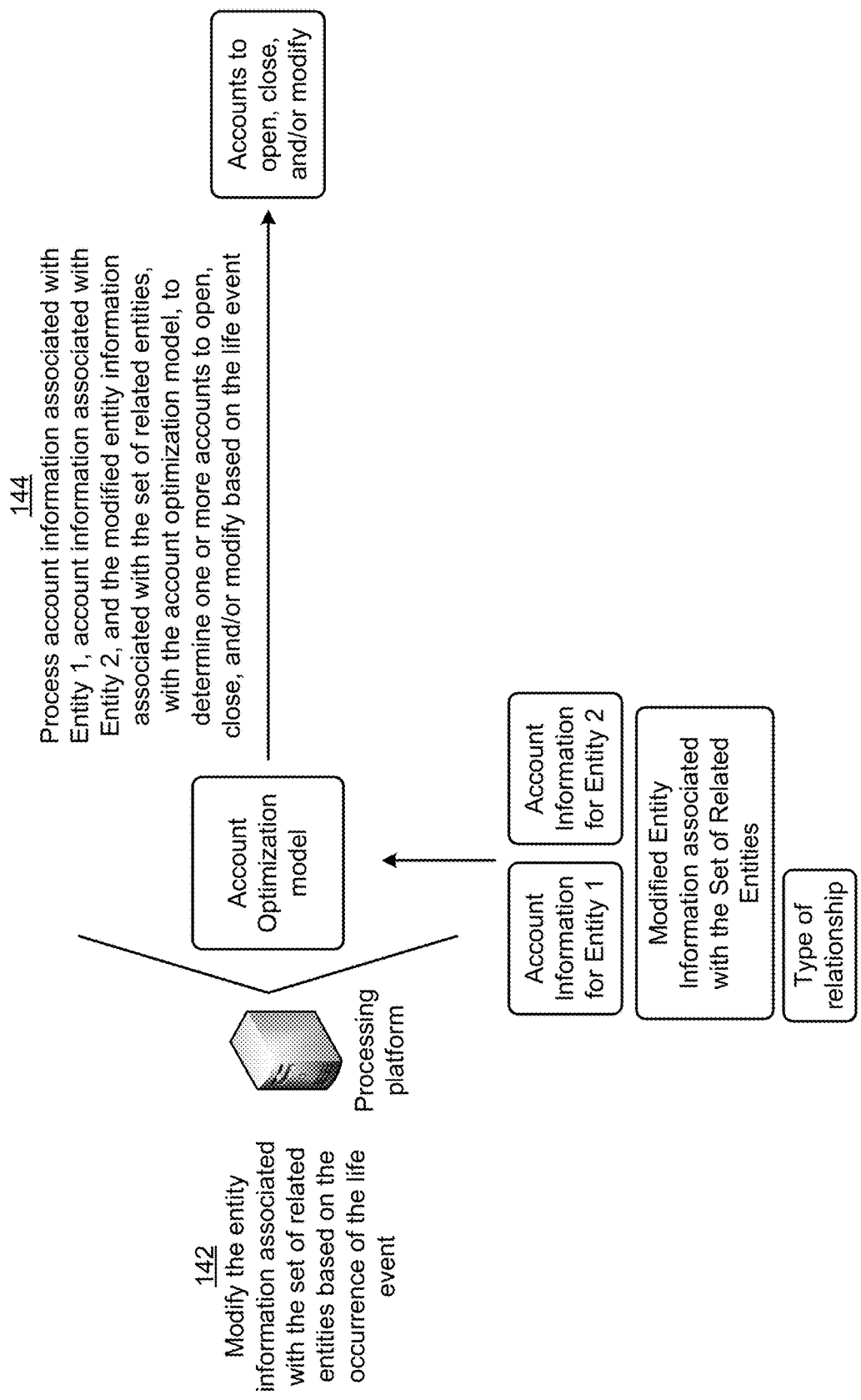

In some implementations, as shown in FIG. 1K, and by reference number 142, the processing platform may modify the entity information associated with the set of related entities based on the occurrence of the life event. For example, the set of related entities may include a first entity and a second entity and the life event may be the birth of a child. The processing platform may modify the entity information associated with the first entity and/or the entity information associated with the second entity to include information identifying the first entity and/or the second entity as having a (or another) dependent, as being a parent of the child, and/or another type of information associated with the life event.

In some implementations, the processing platform may determine one or more modifications to the set of accounts associated with the set of related entities based on the modified entity information associated with the set of related entities. For example, as shown in FIG. 1K, and by reference number 144, the processing platform may process account information associated with the set of related entities and the modified entity information associated with the set of related entities, with the account optimization model, to determine the one or more modifications. In some implementations, the processing platform may determine the one or more modifications in a manner similar to the method described above with regards to FIG. 1D.

In some implementations, the processing platform may determine sets of accounts associated with sets of other related entities having similar entity information (e.g., similar socioeconomic factors) and/or having an occurrence a same, similar, and/or corresponding life event experienced by the set of related entities. The processing platform may determine the one or more modifications based on the sets of accounts associated with the sets of other related entities. For example, the processing platform may analyze the sets of accounts associated with the sets of other related entities and may determine a modification made to one or more of the sets of accounts based on having an occurrence of the same, similar, and/or corresponding life event and may determine to modify the set of accounts associated with the set of related entities in a similar manner.

Figure 1L:
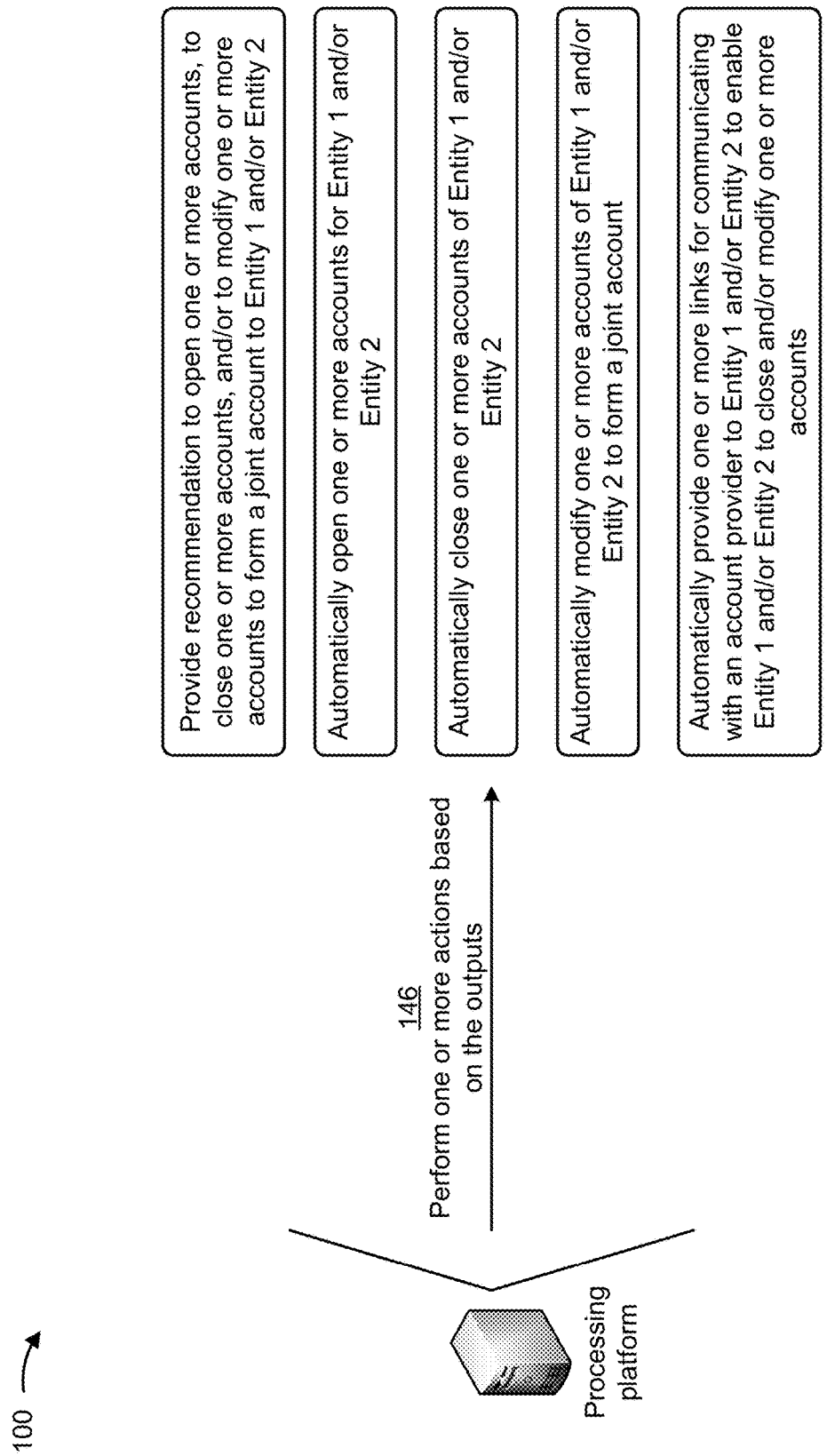

In some implementations, the processing platform may perform one or more actions based on determining the one or more modifications to the set of accounts associated with the related entities. For example, as shown in FIG. 1L, and by reference number 146, the processing platform may perform one or more actions based on the output of the account optimization model. In some implementations, the one or more actions performed by the processing platform may be similar to the one or more actions described above with regards to FIG. 1H.

As indicated above, FIGS. 1A-L are provided as one or more examples. Other examples may differ from what is described with regard to FIGS. 1A-L.

Figure 2:
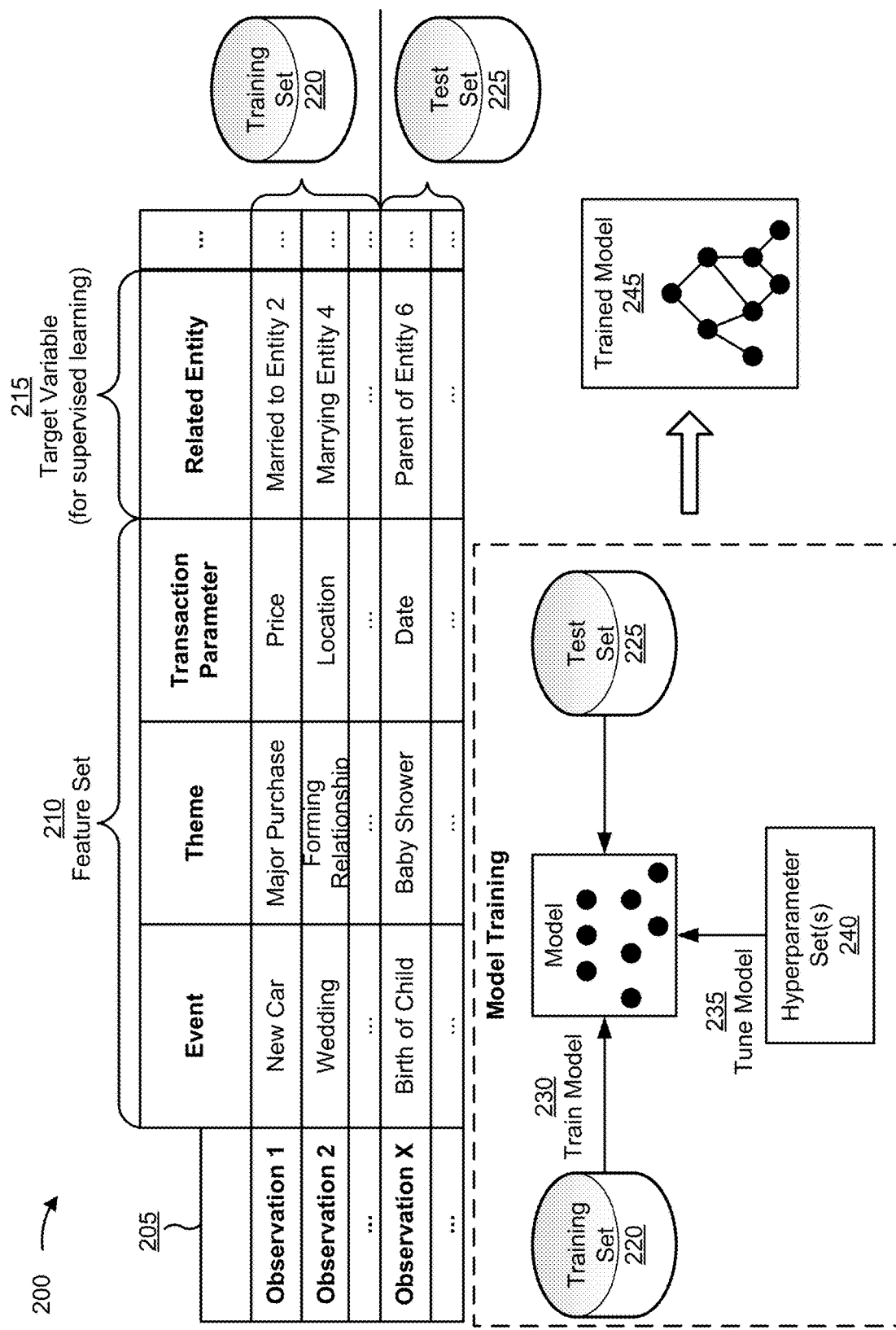
FIG. 2 is a diagram illustrating an example of training a machine learning model.

FIG. 2 is a diagram illustrating an example 200 of training a machine learning model. The machine learning model training described herein may be performed using a machine learning system. The machine learning system may include a computing device, a server, a cloud computing environment, and/or the like, such as processing platform 810, as described elsewhere herein.

As shown by reference number 205, a machine learning model may be trained using a set of observations. The set of observations may be obtained and/or input from historical data, such as data gathered during one or more processes described herein. For example, the set of observations may include data gathered from the server device 805, as described elsewhere herein. In some implementations, the machine learning system may receive the set of observations (e.g., as input) from the processing platform 810.

As shown by reference number 210, a feature set may be derived from the set of observations. The feature set may include a set of variable types. A variable type may be referred to as a feature. A specific observation may include a set of variable values corresponding to the set of variable types. A set of variables values may be specific to an observation. In some cases, different observations may be associated with different sets of variable values, sometimes referred to as feature values.

In some implementations, the machine learning system may determine variable values for a specific observation based on input received from the server device 805 and/or the processing platform 810. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like.

In some implementations, the machine learning system may determine features (e.g., variables types) for a feature set based on input received from the server device 805 and/or the processing platform 810, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of event, a second feature of theme, a third feature of transaction parameter, and so on. As shown, for a first observation, the first feature may have a value of new car (e.g., the purchase of a new car), the second feature may have a value of major purchase, the third feature may have a value of price (e.g., a purchase price of the new car), and so on. These features and feature values are provided as examples, and may differ in other examples. For example, the feature set may include one or more of the following features: a feature indicating an established relationship, a feature indicating a formation of a relationship, a feature indicating an entity conducting a transaction, a feature indicating an entity associated with, but not conducting, the transaction, and/or another feature suitable for determining that an entity is related to another entity. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
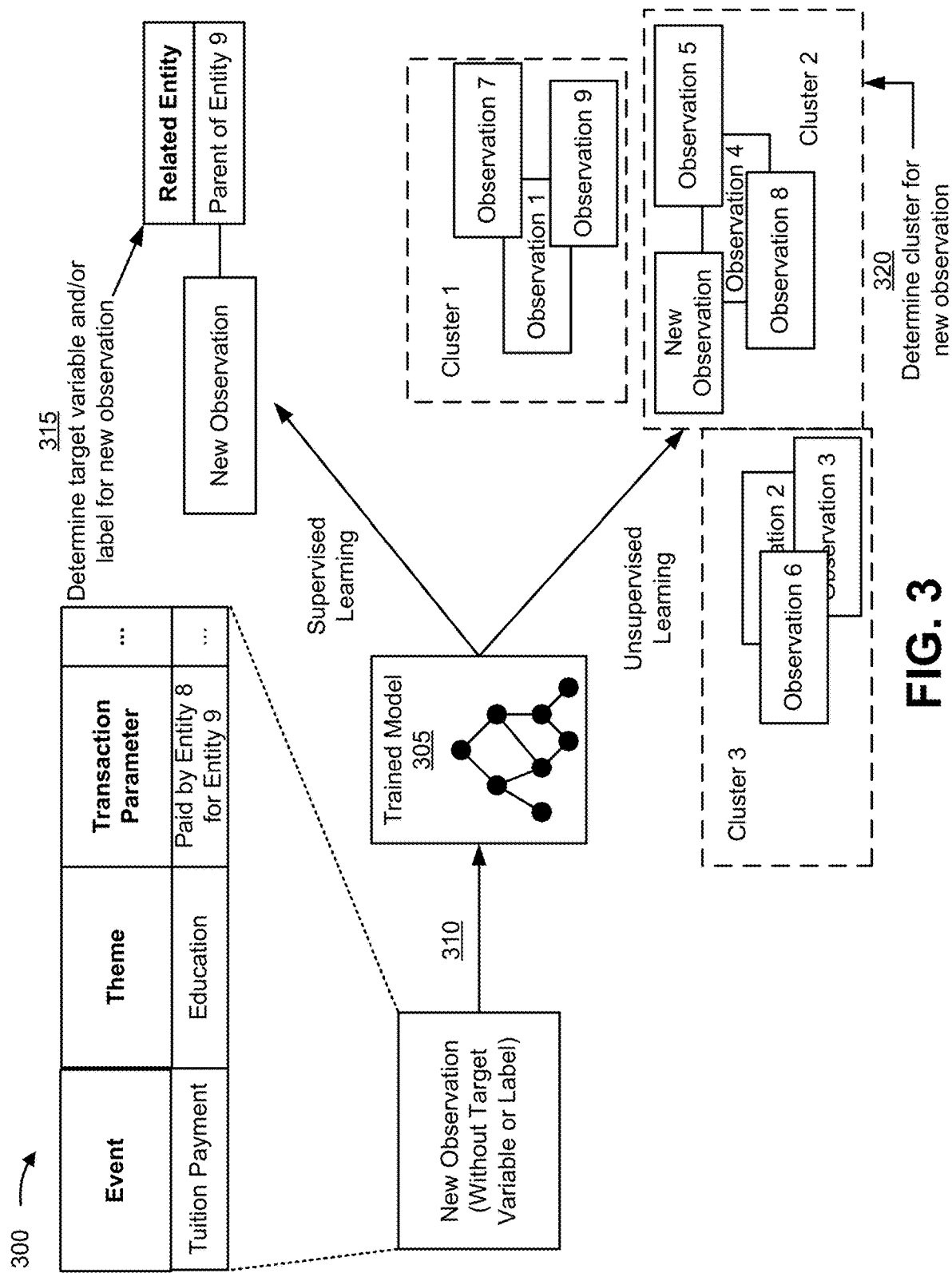
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include a computing device, a server, a cloud computing environment, and/or the like, such as the processing platform 810.

As shown by reference number 310, the machine learning system may receive a new observation (or a set of new observations), and may input the new observation to the machine learning model 305. As shown, the new observation may include a first feature of event, a second feature of theme, a third feature of type of transaction parameter, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observations and one or more prior observations (e.g., which may have previously been new observations input to the machine learning model and/or observations used to train the machine learning model), and/or the like, such as when unsupervised learning is employed.

In some implementations, the trained machine learning model 305 may predict an entity related to an entity associated with the new observation and a type of relationship for the target variable of related entity for the new observation, as shown by reference number 315. Based on this prediction (e.g., based on the value having a particular label/classification, based on the value satisfying or failing to satisfy a threshold, and/or the like), the machine learning system may provide a recommendation, such as Entity 8 and Entity 9 are a set of related entities and the type of relationship is a parent-child relationship. Additionally, or alternatively, the machine learning system may perform an automated action and/or may cause an automated action to be performed (e.g., by instructing another device to perform the automated action), such as storing information (e.g., in a data structure stored in a memory associated with the server device 805 and/or the processing platform 810) identifying Entity 8 and Entity 9 as a set of related entities, storing information identifying a type of relationship as a parent-child relationship, modifying entity information associated with Entity 8 and/or Entity 9 to indicate that Entity 8 and Entity 9 are included in a set of related entities, and/or another automated action associated with identifying Entity 8 and Entity 9 as a set of related entities.

In some implementations, the trained machine learning model 305 may classify (e.g. cluster) the new observation in a cluster, as shown by reference number 320. The observations within a cluster may have a threshold degree of similarity. For example, the observations within a cluster may be observations indicating that a set of entities are related. Based on classifying the new observation in the cluster, the machine learning system may provide a recommendation, such as Entity 8 is related to Entity 9, Entity 8 and Entity 9 form a set of related entities, a parent-child relationship is associated with Entity 8 and Entity 9, Entity 8 is a parent of Entity 9, and/or another recommendation associated with determining that Entity 8 and Entity 9 are included in a set of related entities. Additionally, or alternatively, the machine learning system may perform an automated action and/or may cause an automated action to be performed (e.g., by instructing another device to perform the automated action), such as storing information (e.g., in a data structure stored in a memory associated with the server device 805 and/or the processing platform 810) identifying Entity 8 and Entity 9 as a set of related entities, storing information identifying a type of relationship as a parent-child relationship, modifying entity information associated with Entity 8 and/or Entity 9 to indicate that Entity 8 and Entity 9 are included in a set of related entities, and/or another automated action associated with identifying Entity 8 and Entity 9 as a set of related entities.

In this way, the machine learning system may apply a rigorous and automated process to determine sets of related entities. The machine learning system enables recognition and/or identification of tens, hundreds, thousands, or millions of features and/or feature values for tens, hundreds, thousands, or millions of observations, thereby increasing an accuracy and consistency of determining sets of related entities relative to requiring computing resources to be allocated for tens, hundreds, or thousands of operators to manually determine sets of related entities using the features or feature values.

As indicated above, FIG. 3 is provided as an example. Other examples may differ from what is described in connection with FIG. 3.

Figure 4:
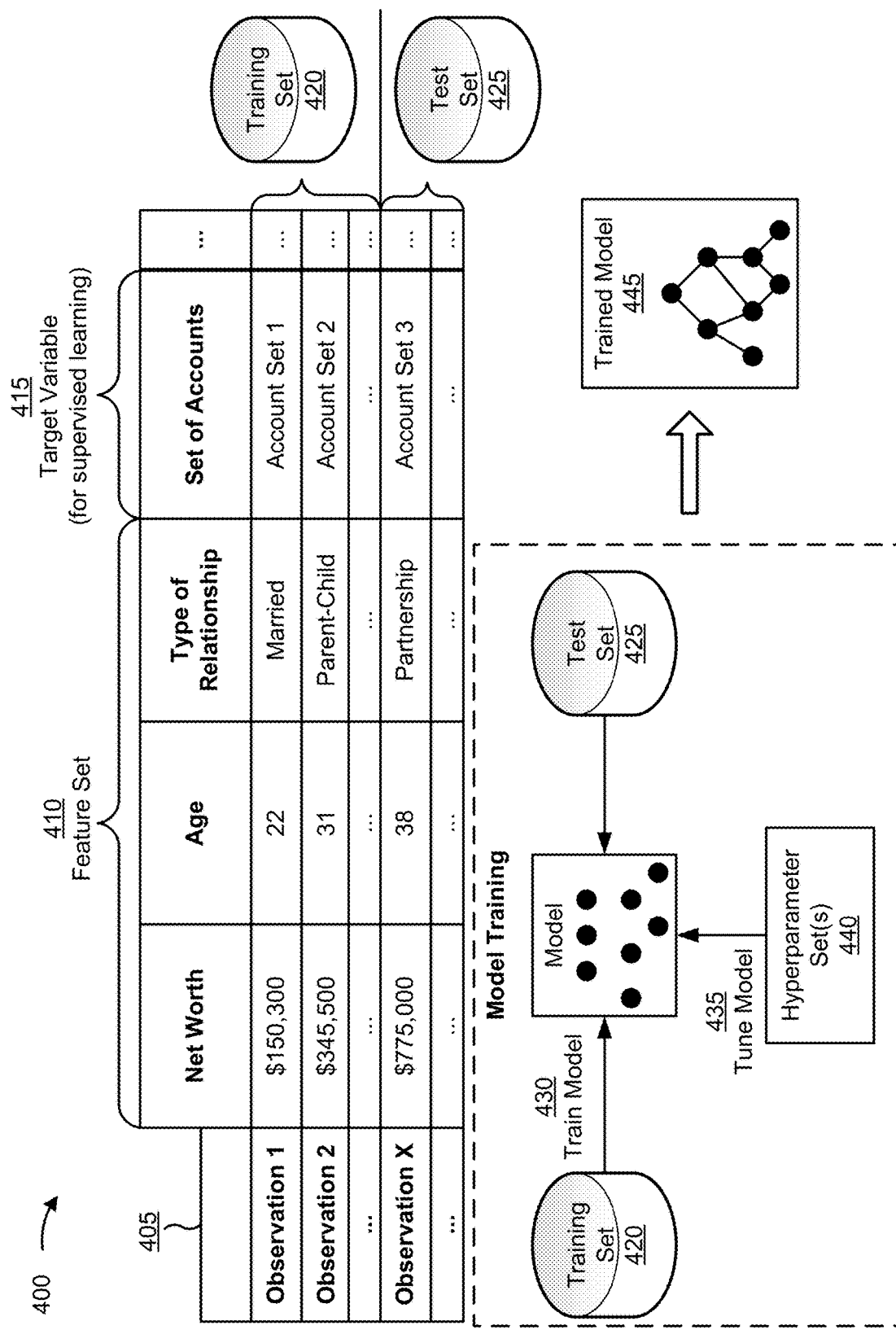
FIG. 4 is a diagram illustrating an example of training a machine learning model.

FIG. 4 is a diagram illustrating an example 400 of training a machine learning model. The machine learning model training described herein may be performed using a machine learning system. The machine learning system may include a computing device, a server, a cloud computing environment, and/or the like, such as processing platform 810.

As shown by reference number 405, a machine learning model may be trained using a set of observations. The set of observations may be obtained and/or input from historical data, such as data gathered during one or more processes described herein. For example, the set of observations may include data gathered from the server device 805 and/or the processing platform 810, as described elsewhere herein. In some implementations, the machine learning system may receive the set of observations (e.g., as input) from the server device 805 and/or the processing platform 810.

As shown by reference number 410, a feature set may be derived from the set of observations. In some implementations, the machine learning system may determine variable values for a specific observation based on input received from the server device 805 and/or the processing platform 810. For example, the machine learning system may identify a feature set in a manner similar to that described above with respect to FIG. 2.

As an example, a feature set for a set of observations may include a first feature of net worth, a second feature of type of age, a third feature of type of relationship, and so on. As shown, for a first observation, the first feature may have a value of $150,300, the second feature may have a value of 22, the third feature may have a value of married, and so on. These features and feature values are provided as examples, and may differ in other examples. For example, the feature set may include one or more of the following features: an account characteristic (e.g., an interest rate, a minimum balance to be maintained, a fee, a rewards program, an outstanding balance, a credit limit, and/or another account characteristic), a length of relationship, a type of account, a socioeconomic factor (e.g., income, education, occupation, net worth, credit score, and/or another socioeconomic factor) and/or another feature suitable for determining a recommended set of accounts for a set of related entities. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 415, the set of observations may be associated with a target variable type. The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the machine learning model, while the test set 425 may be used to evaluate a machine learning model that is trained using the training set 420, for example, in a manner similar to that described above with respect to FIG. 2.

As shown by reference number 430, the machine learning system may train a machine learning model using the training set 420. For example, the machine learning system may train the machine model using the training set 420 in a manner similar to that described above with respect to FIG. 2.

As shown by reference number 435, the machine learning system may use one or more hyperparameter sets 440 to tune the machine learning model. For example, the machine learning system may use one or more hyperparameter sets 440 to tune the machine learning model in a manner similar to that described above with respect to claim 2.

In some implementations, the machine learning system may perform cross-validation when training a machine learning model. For example, the machine learning system may perform cross-validation in a manner similar to that described above with respect to FIG. 2.

In some implementations, the machine learning system may then test the machine learning model using the test set 425 to generate a performance score, such as a mean squared error (e.g., for regression), a mean absolute error (e.g., for regression), an area under receiver operating characteristic curve (e.g., for classification), and/or the like. For example, the machine learning system may test the machine learning model in a manner similar to that described above with respect to FIG. 2. If the machine learning model performs adequately (e.g., with a performance score that satisfies a threshold), then the machine learning system may store that machine learning model as a trained machine learning model 445 to be used to analyze new observations, as described below in connection with FIG. 5.

As indicated above, FIG. 4 is provided as an example. Other examples may differ from what is described in connection with FIG. 4. For example, the machine learning model may be trained using a different process than what is described in connection with FIG. 4. Additionally, or alternatively, the machine learning model may employ a different machine learning algorithm than what is described in connection with FIG. 4, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 5:
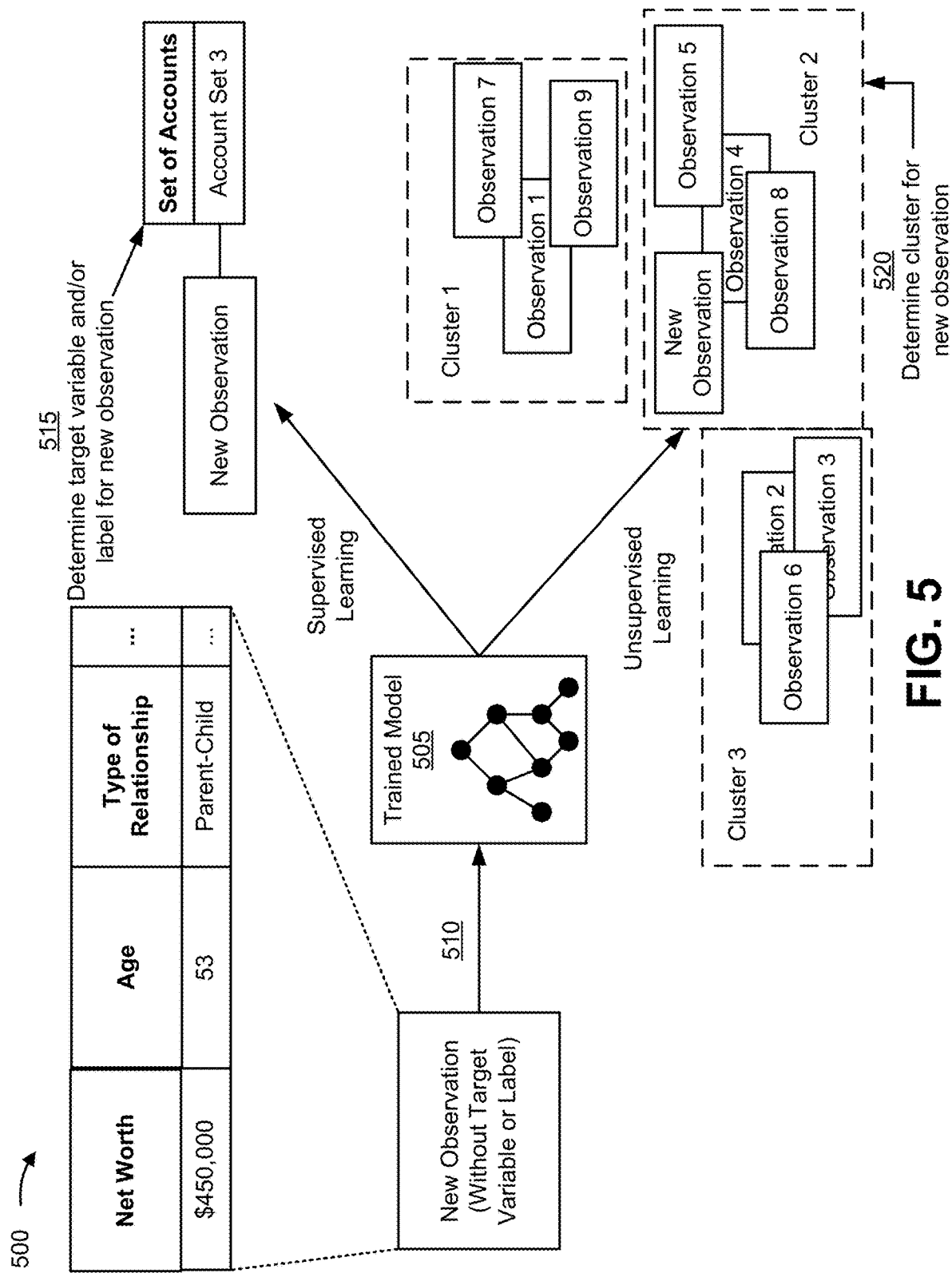
FIG. 5 is a diagram illustrating an example of applying a trained machine learning model to a new observation.

FIG. 5 is a diagram illustrating an example 500 of applying a trained machine learning model to a new observation. The new observation may be input to a machine learning system that stores a trained machine learning model 505. In some implementations, the trained machine learning model 505 may be the trained machine learning model 445 described above in connection with FIG. 4. The machine learning system may include a computing device, a server, a cloud computing environment, and/or the like, such as processing platform 810.

As shown by reference number 510, the machine learning system may receive a new observation (or a set of new observations), and may input the new observation to the machine learning model 505. As shown, the new observation may include a first feature of net worth, a second feature of age, a third feature of type of relationship, and so on, as an example. The machine learning system may apply the trained machine learning model 505 to the new observation to generate an output (e.g., a result). For example, the machine learning system may apply the trained machine learning model 505 to the new observation to generate an output in a manner similar to that described above with respect to FIG. 3.

In some implementations, the trained machine learning model 505 may predict a value of Account Set 3 for the target variable of set of accounts for the new observation, as shown by reference number 515. Based on this prediction (e.g., based on the value having a particular label/classification, based on the value satisfying or failing to satisfy a threshold, and/or the like), the machine learning system may provide a recommendation, such one or more modifications to be made to a set of accounts associated with a set of related entities. Additionally, or alternatively, the machine learning system may perform an automated action and/or may cause an automated action to be performed (e.g., by instructing another device to perform the automated action), such as automatically providing a recommendation to open, close, and/or modify one or more accounts associated with a set of related entities; automatically opening, closing, and/or modifying one or more accounts associated with a set of related entities, automatically providing a link for establishing a telephone to an account provider to enable an entity to open, close, and/or modify an account, and/or another automated action associated with modifying one or more accounts associated with a set of related entities. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 505 may classify (e.g., cluster) the new observation in a cluster, as shown by reference number 520. The observations within a cluster may have a threshold degree of similarity. Based on classifying the new observation in the cluster, the machine learning system may provide a recommendation, such as one or more modifications to make to a set of accounts associated with a set of related entities. Additionally, or alternatively, the machine learning system may perform an automated action and/or may cause an automated action to be performed (e.g., by instructing another device to perform the automated action), such as automatically modifying one or more accounts associated with the set of related entities.

In this way, the machine learning system may apply a rigorous and automated process to determining one or more modifications to a set of accounts associated with a set of related entities. The machine learning system enables recognition and/or identification of tens, hundreds, thousands, or millions of features and/or feature values for tens, hundreds, thousands, or millions of observations, thereby increasing an accuracy and consistency of determining one or more modifications to a set of accounts associated with a set of related entities relative to requiring computing resources to be allocated for tens, hundreds, or thousands of operators to manually determining one or more modifications to a set of accounts associated with a set of related entities using the features or feature values.

As indicated above, FIG. 5 is provided as an example. Other examples may differ from what is described in connection with FIG. 5.

Figure 6:
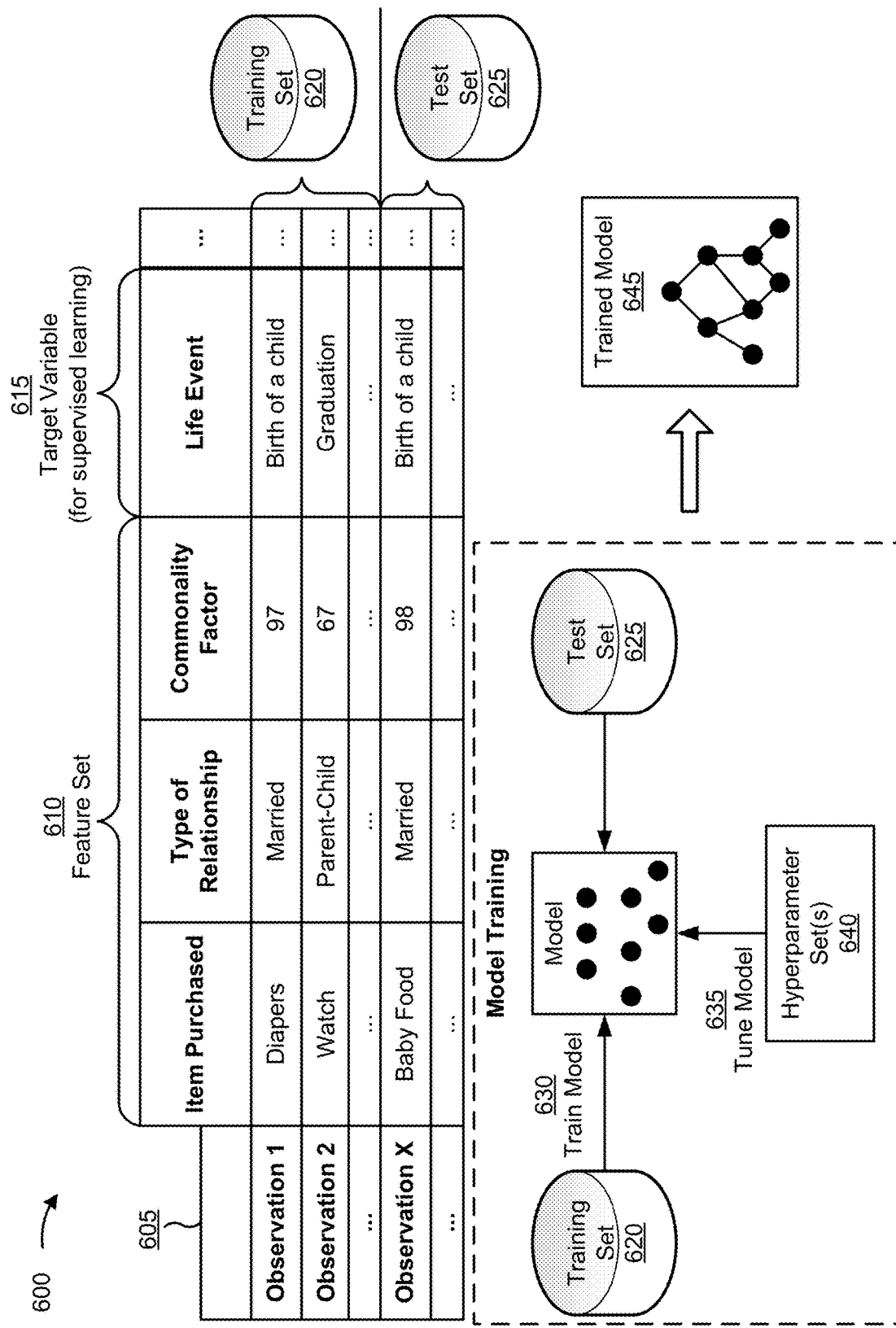
FIG. 6 is a diagram illustrating an example of training a machine learning model.

FIG. 6 is a diagram illustrating an example 600 of training a machine learning model. The machine learning model training described herein may be performed using a machine learning system. The machine learning system may include a computing device, a server, a cloud computing environment, and/or the like, such as the processing platform 810.

As shown by reference number 605, a machine learning model may be trained using a set of observations. The set of observations may be obtained and/or input from historical data, such as data gathered during one or more processes described herein. For example, the set of observations may include data gathered from the server device 805 and/or the processing platform 810, as described elsewhere herein. In some implementations, the machine learning system may receive the set of observations (e.g., as input) from the server device 805 and/or the processing platform 810.

As shown by reference number 610, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from the server device 805 and/or the processing platform 810. For example, the machine learning system may determine variable values for a specific observation in a manner similar to that described above with respect to FIG. 2.

As an example, a feature set for a set of observations may include a first feature of item purchased, a second feature of type of relationship, a third feature of commonality factor, and so on. As shown, for a first observation, the first feature may have a value of diapers, the second feature may have a value of married, the third feature may have a value of 97, and so on. These features and feature values are provided as examples, and may differ in other examples. For example, the feature set may include one or more of the following features: a socioeconomic factor, a length of a relationship, a date of a purchase and/or sale, and/or another feature suitable for determining an occurrence of a life event. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 615, the set of observations may be associated with a target variable type. The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 620 that includes a first subset of observations, of the set of observations, and a test set 625 that includes a second subset of observations of the set of observations. The training set 620 may be used to train (e.g., fit, tune, and/or the like) the machine learning model, while the test set 625 may be used to evaluate a machine learning model that is trained using the training set 620, for example, in a manner similar to that described above with respect to FIG. 2.

As shown by reference number 630, the machine learning system may train a machine learning model using the training set 620. For example, the machine learning system may train the machine model using the training set 620 in a manner similar to that described above with respect to FIG. 2.

As shown by reference number 635, the machine learning system may use one or more hyperparameter sets 640 to tune the machine learning model. For example, the machine learning system may use one or more hyperparameter sets 640 to tune the machine learning model in a manner similar to that described above with respect to claim 2.

In some implementations, the machine learning system may perform cross-validation when training a machine learning model. For example, the machine learning system may perform cross-validation in a manner similar to that described above with respect to FIG. 2.

In some implementations, the machine learning system may then test this machine learning model using the test set 625 to generate a performance score, such as a mean squared error (e.g., for regression), a mean absolute error (e.g., for regression), an area under receiver operating characteristic curve (e.g., for classification), and/or the like. For example, the machine learning system may test the machine learning model in a manner similar to that described above with respect to FIG. 2. If the machine learning model performs adequately (e.g., with a performance score that satisfies a threshold), then the machine learning system may store that machine learning model as a trained machine learning model 645 to be used to analyze new observations, as described below in connection with FIG. 7.

As indicated above, FIG. 6 is provided as an example. Other examples may differ from what is described in connection with FIG. 6. For example, the machine learning model may be trained using a different process than what is described in connection with FIG. 6. Additionally, or alternatively, the machine learning model may employ a different machine learning algorithm than what is described in connection with FIG. 6, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 7:
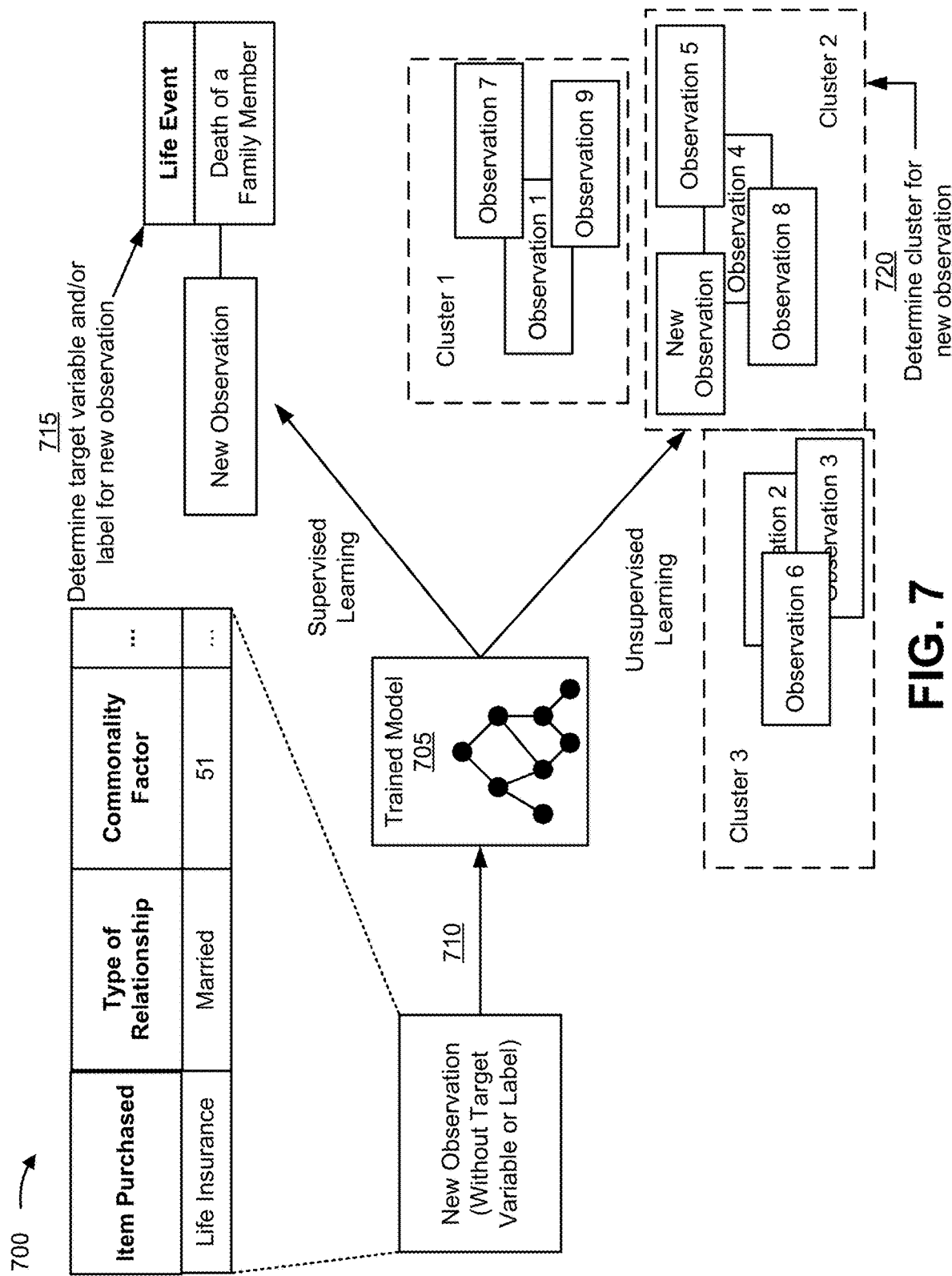
FIG. 7 is a diagram illustrating an example of applying a trained machine learning model to a new observation.

FIG. 7 is a diagram illustrating an example 700 of applying a trained machine learning model to a new observation. The new observation may be input to a machine learning system that stores a trained machine learning model 705. In some implementations, the trained machine learning model 705 may be the trained machine learning model 645 described above in connection with FIG. 6. The machine learning system may include a computing device, a server, a cloud computing environment, and/or the like, such as processing platform 810.

As shown by reference number 710, the machine learning system may receive a new observation (or a set of new observations), and may input the new observation to the machine learning model 705. As shown, the new observation may include a first feature of item purchased, a second feature of type of relationship, a third feature of commonality factor, and so on, as an example. The machine learning system may apply the trained machine learning model 705 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 705 may predict a value of death of a family member for the target variable of life event for the new observation, as shown by reference number 715. Based on this prediction (e.g., based on the value having a particular label/classification, based on the value satisfying or failing to satisfy a threshold, and/or the like), the machine learning system may provide a recommendation, such as providing information identifying a set of related entities and indicating that a particular life event has occurred. Additionally, or alternatively, the machine learning system may perform an automated action and/or may cause an automated action to be performed (e.g., by instructing another device to perform the automated action), such as providing information identifying a set of related entities and indicating that a particular life event has occurred to the account optimization model to be used to determine one or more modifications to the set of accounts associated with the identified set of related entities. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 705 may classify (e.g., cluster) the new observation in a cluster, as shown by reference number 720. The observations within a cluster may have a threshold degree of similarity. Based on classifying the new observation in the cluster, the machine learning system may provide information identifying a set of life events associated with sets of related entities associated.

In this way, the machine learning system may apply a rigorous and automated process to determining an occurrence of a life event. The machine learning system enables recognition and/or identification of tens, hundreds, thousands, or millions of features and/or feature values for tens, hundreds, thousands, or millions of observations, thereby increasing an accuracy and consistency of determining an occurrence of a life event relative to requiring computing resources to be allocated for tens, hundreds, or thousands of operators to manually determining an occurrence of a life event using the features or feature values.

As indicated above, FIG. 7 is provided as an example. Other examples may differ from what is described in connection with FIG. 7.

Figure 8:
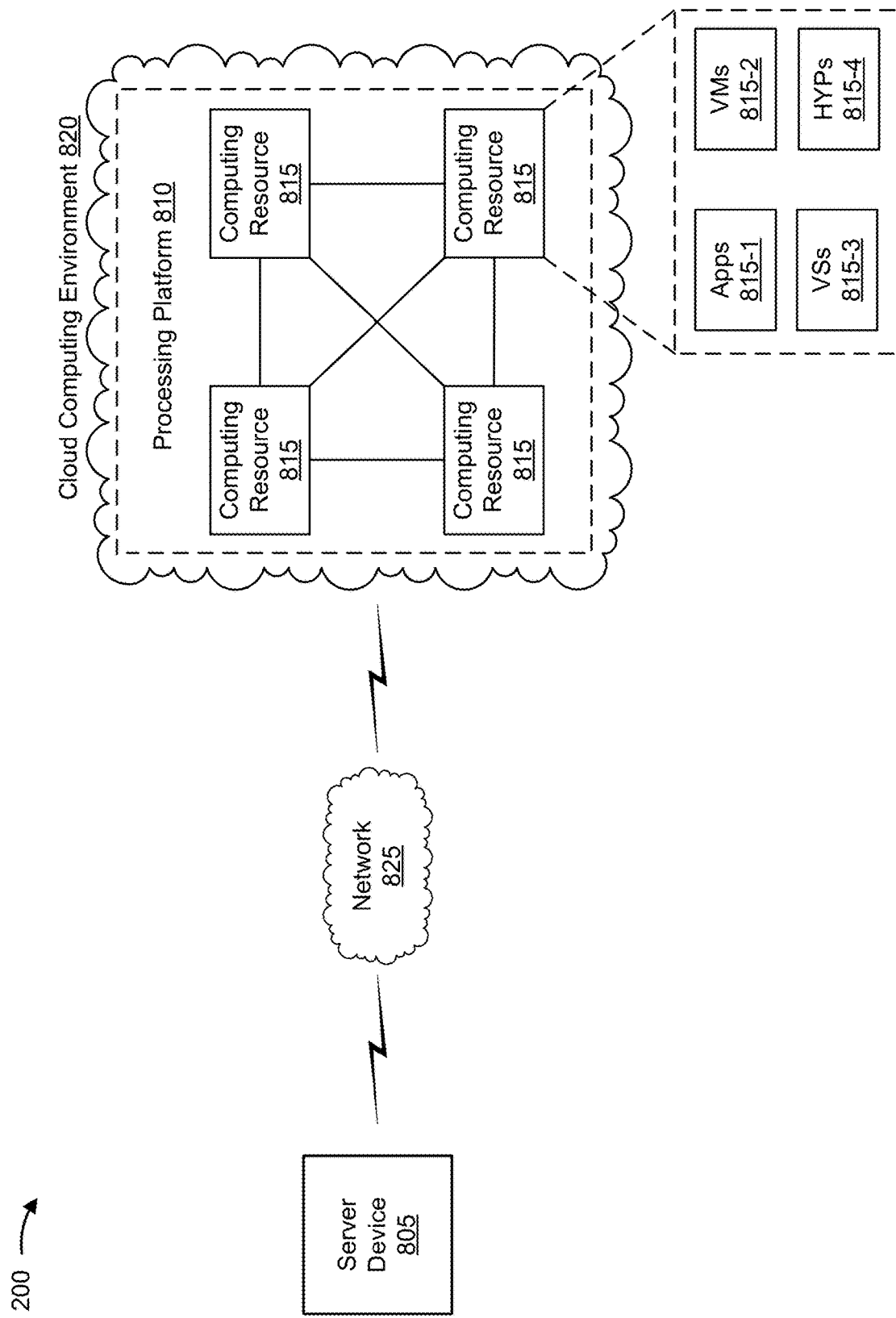
FIG. 8 is a diagram of an example environment in which systems and/or methods described herein may be implemented.

FIG. 8 is a diagram of an example environment 800 in which systems and/or methods, described herein, may be implemented. As shown in FIG. 8, environment 800 may include a server device 805, a processing platform 810, and a network 825. Devices of environment 800 may interconnect via wired connections, wireless connections, or a combination of wired and wireless connections.

Server device 805 includes one or more devices capable of storing, processing, and/or routing information associated with transactions related to an entity and information associated with an entity. In some implementations, server device 805 may provide transaction information and/or entity information to processing platform 810. In some implementations, server device 805 may include a communication interface that allows server device 805 to receive information from and/or transmit information to other devices in environment 800.

Processing platform 810 includes one or more computing resources assigned to analysis of entity information and/or transaction information to determine related sets of entities, sets of accounts associated with related sets of entities, modifications to sets of accounts associated with related sets of entities, and/or an occurrence of a life event. For example, processing platform 810 may be a platform implemented by cloud computing environment 820 that may analyze entity information and/or transaction information to determine related sets of entities, sets of accounts associated with related sets of entities, modifications to sets of accounts associated with related sets of entities, and/or an occurrence of a life event. In some implementations, processing platform 810 is implemented by computing resources 815 of cloud computing environment 820.

Processing platform 810 may include a server device or a group of server devices. In some implementations, processing platform 810 may be hosted in cloud computing environment 820. Notably, while implementations described herein may describe processing platform 810 as being hosted in cloud computing environment 820, in some implementations, processing platform 810 may be non-cloud-based or may be partially cloud-based.

Cloud computing environment 820 includes an environment that delivers computing as a service, whereby shared resources, services, and/or the like may be provided to server device 805 and/or processing device 810. Cloud computing environment 820 may provide computation, software, data access, storage, and/or other services that do not require end-user knowledge of a physical location and configuration of a system and/or a device that delivers the services. As shown, cloud computing environment 820 may include processing device 810.

Computing resource 815 includes one or more personal computers, workstation computers, server devices, or another type of computation and/or communication device. In some implementations, computing resource 815 may host processing platform 810. The cloud resources may include compute instances executing in computing resource 815, storage devices provided in computing resource 815, data transfer devices provided by computing resource 815, and/or the like. In some implementations, computing resource 815 may communicate with other computing resources 815 via wired connections, wireless connections, or a combination of wired and wireless connections.

As further shown in FIG. 8, computing resource 815 may include a group of cloud resources, such as one or more applications ("APPs") 815-1, one or more virtual machines ("VMs") 815-2, virtualized storage ("VSs") 815-3, one or more hypervisors ("HYPs") 815-4, or the like.

Application 815-1 includes one or more software applications that may be provided to or accessed by processing platform 810. Application 815-1 may eliminate a need to install and execute the software applications on processing platform 810. For example, application 815-1 may include software associated with processing platform 810 and/or any other software capable of being provided via cloud computing environment 820. In some implementations, one application 815-1 may send/receive information to/from one or more other applications 815-1, via virtual machine 815-2.

Virtual machine 815-2 includes a software implementation of a machine (e.g., a computer) that executes programs like a physical machine. Virtual machine 815-2 may be either a system virtual machine or a process virtual machine, depending upon use and degree of correspondence to any real machine by virtual machine 815-2. A system virtual machine may provide a complete system platform that supports execution of a complete operating system ("OS"). A process virtual machine may execute a single program and may support a single process. In some implementations, virtual machine 815-2 may execute on behalf of a user (e.g., processing platform 810), and may manage infrastructure of cloud computing environment 820, such as data management, synchronization, or long-duration data transfers.

Virtualized storage 815-3 includes one or more storage systems and/or one or more devices that use virtualization techniques within the storage systems or devices of computing resource 815. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 815-4 provides hardware virtualization techniques that allow multiple operating systems (e.g., "guest operating systems") to execute concurrently on a host computer, such as computing resource 815. Hypervisor 815-4 may present a virtual operating platform to the "guest operating systems" and may manage the execution of the guest operating systems. Multiple instances of a variety of operating systems may share virtualized hardware resources.

Network 825 includes one or more wired and/or wireless networks. For example, network 825 can include a cellular network (e. g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, a core network, and/or the like, and/or a combination of these or other types of networks.

The number and arrangement of devices and networks shown in FIG. 8 are provided as one or more examples. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
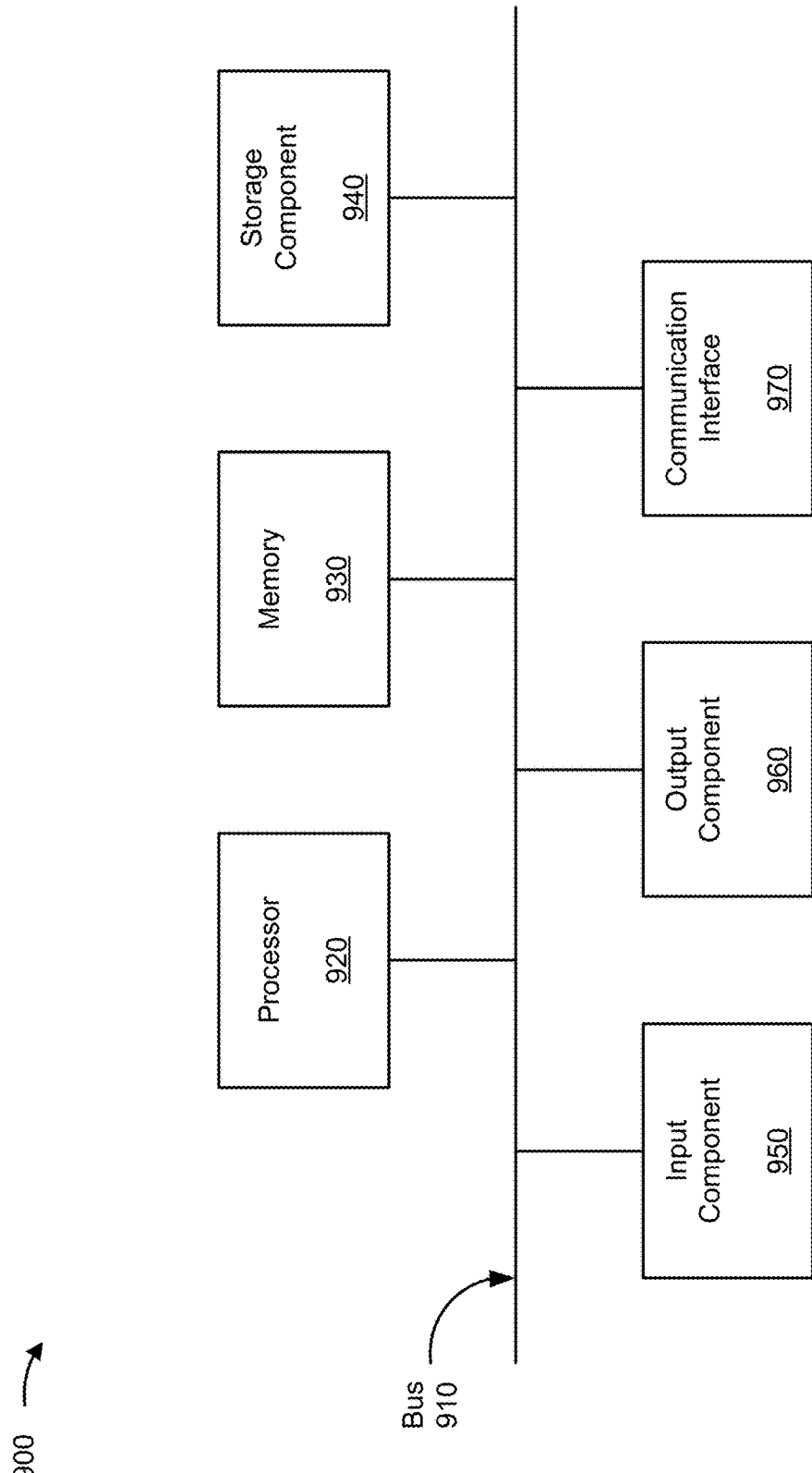
FIG. 9 is a diagram of example components of one or more devices of FIG. 8.

FIG. 9 is a diagram of example components of a device 900. Device 900 may correspond to server device 805, processing platform 810, and/or computing resource 815. In some implementations, server device 805, processing platform 810, and/or computing resource 815 may include one or more devices 900 and/or one or more components of device 900. As shown in FIG. 9, device 900 may include a bus 910, a processor 920, a memory 930, a storage component 940, an input component 950, an output component 960, and a communication interface 970.

Bus 910 includes a component that permits communication among multiple components of device 900. Processor 920 is implemented in hardware, firmware, and/or a combination of hardware and software. Processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 includes a component that provides output information from device 900 (via, e.g., a display, a speaker, a haptic feedback component, an audio or visual indicator, and/or the like).

Communication interface 970 includes a transceiver-like component (e.g., a transceiver, a separate receiver, a separate transmitter, and/or the like) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

Device 900 may perform one or more processes described herein. Device 900 may perform these processes based on processor 920 executing software instructions stored by a non-transitory computer-readable medium, such as memory 930 and/or storage component 940. As used herein, the term "computer-readable medium" refers to a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
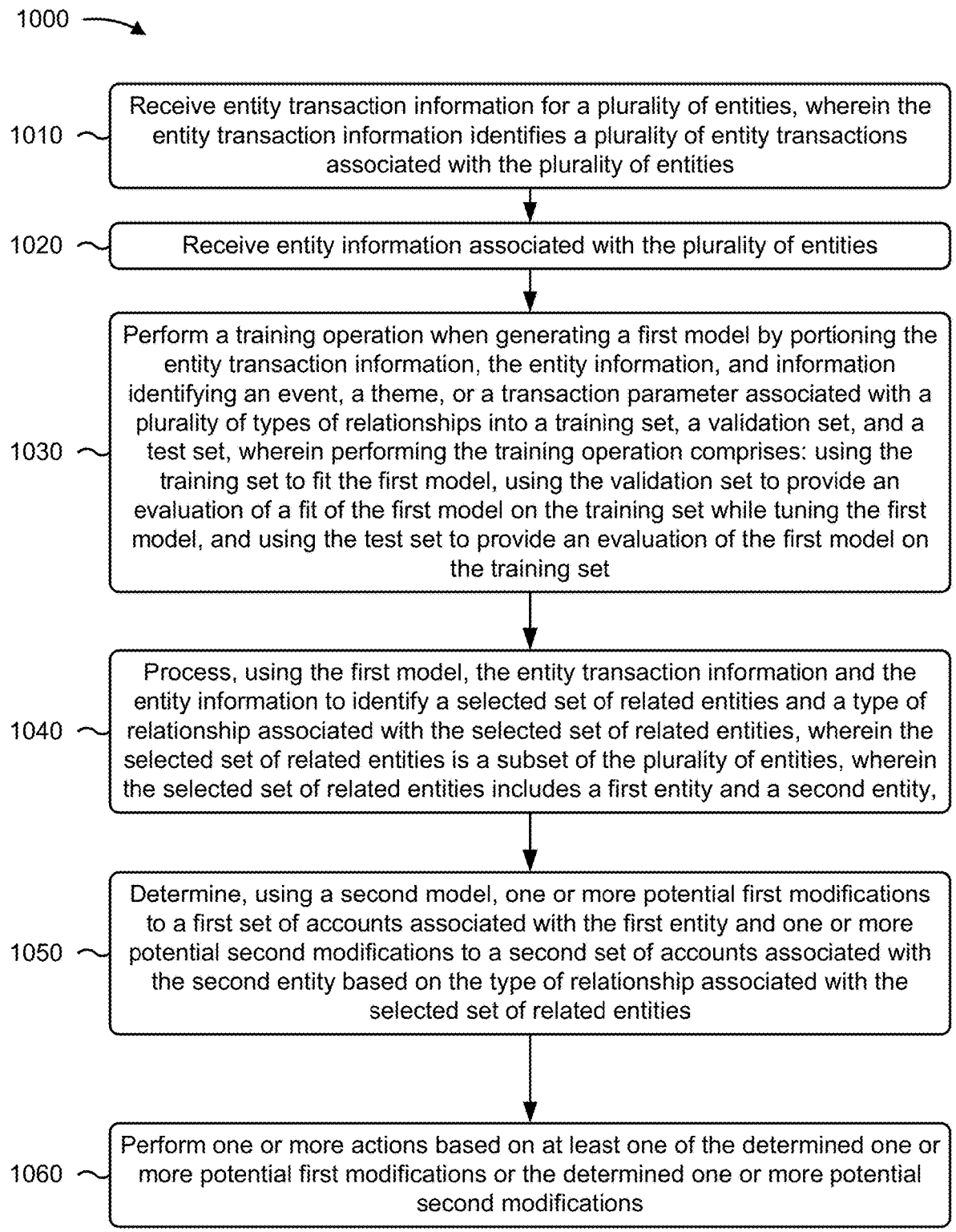
FIG. 10 is a flowchart of an example process for performing a merger and optimization operation.

FIG. 10 is a flow chart of an example process 1000 for performing a merger and optimization operation. In some implementations, one or more process blocks of FIG. 10 may be performed by a device (e.g., processing platform 810). In some implementations, one or more process blocks of FIG. 10 may be performed by another device or a group of devices separate from or including the device, such as server device 805, computing resource 815, and/or the like.

As shown in FIG. 10, process 1000 may include receiving transaction information for a plurality of entities, wherein the transaction information identifies a plurality of transactions associated with the plurality of entities (block 1010). For example, the processing platform 810 (e.g., using processor 920, memory 930, storage component 940, input component 950, output component 960, communication interface 970, and/or the like) may receive transaction information for a plurality of entities, as described above. In some implementations, the transaction information identifies a plurality of transactions associated with the plurality of entities.

As further shown in FIG. 10, process 1000 may include receiving entity information associated with the plurality of entities (block 1020). For example, the processing platform 810 (e.g., using processor 920, memory 930, storage component 940, input component 950, output component 960, communication interface 970, and/or the like) may receive entity information associated with the plurality of entities, as described above.

As further shown in FIG. 10, process 1000 may include performing a training operation when generating a first model by portioning the transaction information, the entity information, and information identifying an event, a theme, or a transaction parameter associated with a plurality of types of relationships into a training set, a validation set, and a test set, wherein performing the training operation comprises: using the training set to fit the first model, using the validation set to provide an evaluation of a fit of the first model on the training set while tuning the first model, and using the test set to provide an evaluation of the first model on the training set (block 1030). For example, the processing platform 810 (e.g., using processor 920, memory 930, storage component 940, input component 950, output component 960, communication interface 970, and/or the like) may perform a training operation when generating a first model by portioning the transaction information, the entity information, and information identifying an event, a theme, or a transaction parameter associated with a plurality of types of relationships into a training set, a validation set, and a test set, as described above.

In some implementations, performing the training operation comprises using the training set to fit the first model, using the validation set to provide an evaluation of a fit of the first model on the training set while tuning the first model, and using the test set to provide an evaluation of the first model on the training set.

As further shown in FIG. 10, process 1000 may include processing, using the first model, the transaction information and the entity information to identify a set of related entities and a type of relationship associated with the set of related entities, wherein the set of related entities is a subset of the plurality of entities, wherein the set of related entities includes a first entity and a second entity, wherein the first model receives, as inputs, the transaction information and the entity information, and wherein the first model outputs information identifying the set of related entities and the type of relationship associated with the set of related entities based on the set of related entities being associated with the event, the theme, or the transaction parameter (block 1040). For example, the processing platform 810 (e.g., using processor 920, memory 930, storage component 940, input component 950, output component 960, communication interface 970, and/or the like) may process, using the first model, the transaction information and the entity information to identify a set of related entities and a type of relationship associated with the set of related entities, as described above.

In some implementations, the set of related entities is a subset of the plurality of entities. In some implementations, the set of related entities includes a first entity and a second entity. In some implementations, the first model receives, as inputs, the transaction information and the entity information. In some implementations, the first model outputs information identifying the set of related entities and the type of relationship associated with the set of related entities based on the set of related entities being associated with the event, the theme, or the transaction parameter.

As further shown in FIG. 10, process 1000 may include determining, using a second model, one or more first modifications to a first set of accounts associated with the first entity and one or more second modifications to a second set of accounts associated with the second entity based on the type of relationship associated with the set of related entities, wherein the second model receives information identifying the first set of accounts, information identifying the second set of accounts, and information identifying the type of relationship, and wherein the second model outputs information identifying the one or more first modifications and the one or more second modifications (block 1050). For example, the processing platform 810 (e.g., using processor 920, memory 930, storage component 940, input component 950, output component 960, communication interface 970, and/or the like) may determine, using a second model, one or more first modifications to a first set of accounts associated with the first entity and one or more second modifications to a second set of accounts associated with the second entity based on the type of relationship associated with the set of related entities, as described above. In some implementations, the second model receives information identifying the first set of accounts, information identifying the second set of accounts, and information identifying the type of relationship. In some implementations, the second model outputs information identifying the one or more first modifications and the one or more second modifications.

As further shown in FIG. 10, process 1000 may include performing one or more actions based on at least one of the determined one or more first modifications or the determined one or more second modifications (block 1060). For example, the processing platform 810 (e.g., using processor 920, memory 930, storage component 940, input component 950, output component 960, communication interface 970, and/or the like) may perform one or more actions based on at least one of the determined one or more first modifications or the determined one or more second modifications, as described above.

Process 1000 may include additional implementations, such as any single implementation or any combination of implementations described below and/or in connection with one or more other processes described elsewhere herein.

In a first implementation, process 1000 includes performing another training operation when generating the second model by portioning a portion of the transaction information that is associated with the type of relationship, a portion of the entity information that is associated with the type of relationship, and a portion of the information identifying the event, the theme, or the transaction parameter that is associated with the type of relationship into another training set, another validation set, and another test set, wherein performing the other training operation comprises: using the other training set to fit the second model, using the other validation set to provide an evaluation of a fit of the second model on the other training set while tuning the second model, and using the other test set to provide an evaluation of the second model on the other training set.

For example, the processing platform 810 may perform another training operation when generating the second model by portioning a portion of the transaction information that is associated with the type of relationship, a portion of the entity information that is associated with the type of relationship, and a portion of the information identifying the event, the theme, or the transaction parameter that is associated with the type of relationship into another training set, another validation set, and another test set, as described above. When performing the other training operation, the processing platform may use the other training set to fit the second model, use the other validation set to provide an evaluation of a fit of the second model on the other training set while tuning the second model, and use the other test set to provide an evaluation of the second model on the other training set, as described above.

In a second implementation, alone or in combination with the first implementation, processing the transaction information and the entity information to identify the set of related entities and the type of relationship associated with the set of related entities includes: utilizing machine learning to process the transaction information and the entity information to identify the set of related entities and the type of relationship associated with the set of related entities.

For example, when processing the transaction information and the entity information to identify the set of related entities and the type of relationship associated with the set of related entities, the processing platform 810 may utilize machine learning to process the transaction information and the entity information to identify the set of related entities and the type of relationship associated with the set of related entities, as described above.

In a third implementation, alone or in combination with one or more of the first and second implementations, process 1000 includes obtaining transaction information associated with the set of related entities; processing, using a third model, the transaction information associated with the set of related entities to determine an occurrence of the event; and determining, using a fourth model, one or more third modifications to the first set of accounts and one or more fourth modifications to the second set of accounts based on the occurrence of the event. For example, the processing platform 810 may obtain transaction information associated with the set of related entities; processing, may use a third model, the transaction information associated with the set of related entities to determine an occurrence of the event; and may determine, using a fourth model, one or more third modifications to the first set of accounts and one or more fourth modifications to the second set of accounts based on the occurrence of the event, as described above.

In a fourth implementation, alone or in combination with one or more of the first through third implementations, the one or more actions comprise: providing the information identifying the one or more first modifications and the information identifying the one or more second modifications, and the method further comprises: receiving an input from the first entity based on providing the information identifying the one or more first modifications and the information identifying the one or more second modifications; and modifying an account included in the first set of accounts to form a joint account associated with the first entity and the second entity based on the input. For example, when performing the one or more actions, the processing platform 810 may provide the information identifying the one or more first modifications and the information identifying the one or more second modifications, as described above. The processing platform 810 may further receive an input from the first entity based on providing the information identifying the one or more first modifications and the information identifying the one or more second modifications; and may modify an account included in the first set of accounts to form a joint account associated with the first entity and the second entity based on the input, as described above.

In a fifth implementation, alone or in combination with one or more of the first through fourth implementations, the type of relationship includes a legal union between the first entity and the second entity.

In a sixth implementation, alone or in combination with one or more of the first through fifth implementations, the one or more actions comprise at least one of: providing information indicating that the first account and the second account have been consolidated, providing a recommendation to form a joint account associated with the first entity and the second entity, automatically closing a first account included in the first set of accounts, providing a recommendation to modify a second account included in the second set of accounts, automatically modifying the second account, automatically providing one or more links for establishing a telephone call to an account provider associated with the first account, providing a recommendation to open a new account, or automatically opening the new account. For example, when performing the one or more actions, the processing platform 810 may perform at least one of: indicating that the first account and the second account have been consolidated, providing a recommendation to form a joint account associated with the first entity and the second entity, automatically closing a first account included in the first set of accounts, providing a recommendation to modify a second account included in the second set of accounts, automatically modifying the second account, automatically providing one or more links for establishing a telephone call to an account provider associated with the first account, providing a recommendation to open a new account, or automatically opening the new account, as described above.

In a seventh implementation, alone or in combination with one or more of the first through sixth implementations, process 1000 includes obtaining transaction information associated with the set of related entities, processing, using a third model, the transaction information associated with the set of related entities to determine an occurrence of another event, and determining, using a fourth model, an additional modification to the set of accounts based on the occurrence of the other event. For example, the processing platform 810 may obtain transaction information associated with the set of related entities, process, using a third model, the transaction information associated with the set of related entities to determine an occurrence of another event, and determine, using a fourth model, an additional modification to the set of accounts based on the occurrence of the other event, as described herein.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the implementations described herein collect, store, process, and/or utilize personal information provided by individuals, it should be understood that such information is to be used in accordance with all applicable laws. Additionally, the collection, storage, processing, and/or utilizing of such information may require consent of the individual to such activity. For example, collecting, storing, processing, and/or utilizing personal information or information indicating a transaction history of an account may require an individual to consent via an opt-in procedure. Additionally, the individual may be permitted to remove consent via an opt-out procedure. Storage and use of personal information can be in an appropriately secure manner appropriate for the type of information, for example, through various encryption and anonymization techniques for particularly sensitive information. Furthermore, to display and/or provide a link to a third party website or program, an authorized individual associated with the third party website or program may have to provide permission to display and/or provide the link.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, transaction information for a plurality of entities,
  wherein the transaction information identifies a plurality of transactions associated with the plurality of entities;
receiving, by the device, entity information associated with the plurality of entities;
performing, by the device, a training operation when generating a first model by portioning the transaction information, the entity information, and information identifying an event, a theme, or a transaction parameter associated with a plurality of types of relationships into a training set, a validation set, and a test set,
  wherein performing the training operation comprises:
    using the training set to fit the first model,
    using the validation set to provide an evaluation of a fit of the first model on the training set while tuning the first model, and
    using the test set to provide an evaluation of the first model on the training set;
processing, by the device and using the first model, the transaction information and the entity information to identify a set of related entities and a type of relationship associated with the set of related entities,
  wherein the set of related entities is a subset of the plurality of entities,
  wherein the set of related entities includes a first entity and a second entity,
  wherein the first model receives, as inputs, the transaction information and the entity information,
  wherein processing the transaction information and the entity information to identify the set of related entities and the type of relationship associated with the set of related entities includes determining that the first entity and the second entity are related to each other based on the first entity and the second entity being associated with one or more transactions associated with the event, and
  wherein the first model outputs information identifying the set of related entities and the type of relationship associated with the set of related entities based on the set of related entities being associated with the event;
determining, by the device and using a second model, one or more first modifications to a first set of accounts associated with the first entity and one or more second modifications to a second set of accounts associated with the second entity based on the type of relationship associated with the set of related entities and based on determining a recommended set of accounts,
  wherein determining the recommended set of accounts includes:
    identifying a type of account associated with each account included in sets of accounts associated with other sets of related entities,
    determining a commonality factor associated with the type of account, and
    determining to include the type of account in the recommended set of accounts based on the commonality factor,
  wherein the second model receives information identifying the first set of accounts, information identifying the second set of accounts, and information identifying the type of relationship, and
  wherein the second model outputs information identifying the one or more first modifications and the one or more second modifications; and
performing, by the device, one or more actions based on at least one of the one or more first modifications or the one or second modifications.

2. The method of claim 1, further comprising:
performing another training operation when generating the second model by portioning a portion of the transaction information that is associated with the type of relationship, a portion of the entity information that is associated with the type of relationship, and a portion of the information identifying the event, the theme, or the transaction parameter that is associated with the type of relationship into another training set, another validation set, and another test set,
  wherein performing the other training operation comprises:
    using the other training set to fit the second model,
    using the other validation set to provide an evaluation of a fit of the second model on the other training set while tuning the second model, and
    using the other test set to provide an evaluation of the second model on the other training set.

3. The method of claim 1, wherein processing the transaction information and the entity information to identify the set of related entities and the type of relationship associated with the set of related entities includes:
utilizing machine learning to process the transaction information and the entity information to identify the set of related entities and the type of relationship associated with the set of related entities.

4. The method of claim 1, further comprising:
obtaining transaction information associated with the set of related entities;
processing, using a third model, the transaction information associated with the set of related entities to determine an occurrence of the event; and
determining, using a fourth model, one or more third modifications to the first set of accounts and one or more fourth modifications to the second set of accounts based on the occurrence of the event.

5. The method of claim 1, wherein the one or more actions comprise:
providing the information identifying the one or more first modifications and the information identifying the one or more second modifications; and
wherein the method further comprises:
  receiving an input from the first entity based on providing the information identifying the one or more first modifications and the information identifying the one or more second modifications; and modifying an account included in the first set of accounts to form a joint account associated with the first entity and the second entity based on the input.

6. The method of claim 1, wherein the type of relationship includes a legal union between the first entity and the second entity.

7. The method of claim 1, further comprising:
automatically consolidating a first account included in the first set of accounts and a second account included in the second set of accounts; and
wherein the one or more actions comprise:
providing information indicating that the first account and the second account have been consolidated.

8. A device, comprising:
one or more memories; and
one or more processors communicatively coupled to the one or more memories, configured to:
receive transaction information for a plurality of entities,
wherein the transaction information identifies a plurality of transactions associated with the plurality of entities;
receive entity information associated with the plurality of entities;
generate a first model based on the transaction information, the entity information, and information identifying an event, a theme, or a transaction parameter associated with a plurality of types of relationships;
process, using the first model, the transaction information and the entity information to identify a set of related entities and a type of relationship associated with the set of related entities,
wherein the set of related entities is a subset of the plurality of entities,
wherein the set of related entities includes a first entity and a second entity,
wherein the first model receives, as inputs, the transaction information and the entity information,
wherein the one or more processors, when processing the transaction information and the entity information to identify the set of related entities and the type of relationship associated with the set of related entities, are to:
determine an occurrence of the event based on determining that one or more transactions included in the transaction information are associated with the event,
determine that the first entity and the second entity are related to each other based on the first entity and the second entity being associated with one or more transactions associated with the event, and
wherein the first model outputs information identifying the set of related entities and the type of relationship associated with the set of related entities based on the set of related entities being associated with the event;
determine, using a second model, one or more first modifications to a first set of accounts associated with the first entity and one or more second modifications to a second set of accounts associated with the second entity based on the type of relationship associated with the set of related entities and based on determining a recommended set of accounts,
wherein the one or more processors, when determining the recommended set of accounts, are configured to:
identify a type of account associated with each account included in sets of accounts associated with other sets of related entities,
determine a commonality factor associated with the type of account, and
determine to include the type of account in the recommended set of accounts based on the commonality factor,
wherein the second model receives information identifying the first set of accounts, information identifying the second set of accounts, and information identifying the type of relationship, and
wherein the second model outputs information identifying the one or more first modifications and the one or more second modifications; and
perform one or more actions based on at least one of the one or more first modifications or the one or more second modifications.

9. The device of claim 8, wherein the one or more processors are further configured to:
perform a training operation when generating the first model by portioning the transaction information, the entity information, and information identifying the event, the theme, or the transaction parameter associated with the plurality of types of relationships into a training set, a validation set, and a test set,
wherein the one or more processors, when performing the training operation, are configured to:
use the training set to fit the first model,
use the validation set to provide an evaluation of a fit of the first model on the training set while tuning the first model, and
use the test set to provide an evaluation of the first model on the training set.

10. The device of claim 8, wherein the one or more processors, when processing the transaction information and the entity information to identify the set of related entities and the type of relationship associated with the set of related entities, are to:
utilize machine learning to process the transaction information and the entity information to identify the set of related entities and the type of relationship associated with the set of related entities.

11. The device of claim 8, wherein the one or more processors are further configured to:
obtain transaction information associated with the set of related entities;
process, using a third model, the transaction information associated with the set of related entities to determine an occurrence of a life event associated with the set of related entities; and
determine, using a fourth model, one or more third modifications to the first set of accounts associated and one or more fourth modifications to the second set of accounts based on the occurrence of the life event.

12. The device of claim 8, wherein the one or more actions comprise at least one of:
a first action for providing a recommendation to form a joint account associated with the first entity and the second entity;
a second action for automatically closing a first account included in the first set of accounts;
a third action for providing a recommendation to modify a second account included in the second set of accounts;
a fourth action for automatically modifying the second account;

a fifth action for automatically providing one or more links for establishing a telephone call to an account provider associated with the first account;
a sixth action for providing a recommendation to open a new account; or
a seventh action for automatically opening the new account.

13. The device of claim 8, wherein the type of relationship includes a parent-child relationship.

14. The device of claim 8, wherein the one or more processors are further configured to:
automatically consolidate a first account included in the first set of accounts and a second account included in the second set of accounts; and
wherein the one or more processors, when providing the information identifying the one or more first modifications and the information identifying the one or more second modifications, are to:
provide information indicating that the first account and the second account have been consolidated.

15. A non-transitory computer-readable medium storing instructions, the instructions comprising:
one or more instructions that, when executed by one or more processors, cause the one or more processors to:
receive transaction information for a plurality of entities,
wherein the transaction information identifies a plurality of transactions associated with the plurality of entities;
receive entity information associated with the plurality of entities;
process, using a first model, the transaction information and the entity information to identify a set of related entities and a type of relationship associated with the set of related entities,
wherein the set of related entities is a subset of the plurality of entities,
wherein the set of related entities includes a first entity and a second entity,
wherein the first model receives, as inputs, the transaction information and the entity information,
wherein the one or more instructions that cause the one or more processors to process the transaction information and the entity information to identify the set of related entities and the type of relationship associated with the set of related entities, cause the one or more processors to:
determine an occurrence of an event based on determining that one or more transactions included in the transaction information are associated with the event,
determine that the first entity and the second entity are related to each other based on the first entity and the second entity being associated with one or more transactions associated with the event, and
wherein the first model outputs information identifying the set of related entities and the type of relationship associated with the set of related entities based on the set of related entities being associated with the event;
determine, using a second model, one or more potential modifications to a set of accounts associated with the set of related entities based on the type of relationship associated with the set of related entities and based on determining a recommended set of accounts,
wherein the one or more instructions, that cause the one or more processors to determine the recommended set of accounts, cause the one or more processors to:
identify a type of account associated with each account included in sets of accounts associated with other sets of related entities,
determine a commonality factor associated with the type of account, and
determine to include the type of account in the recommended set of accounts based on the commonality factor,
wherein the second model receives information identifying the set of accounts and information identifying the type of relationship, and
wherein the second model outputs information identifying the one or more potential modifications; and
provide, via a network, information identifying the one or more potential modifications.

16. The non-transitory computer-readable medium of claim 15, wherein the one or more instructions, when executed by the one or more processors, further cause the one or more processors to:
perform a training operation when generating the first model by portioning the transaction information, the entity information, and the information identifying the event into a training set, a validation set, and a test set,
wherein the one or more instructions, that cause the one or more processors to perform the training operation, cause the one or more processors to:
use the training set to fit the first model,
use the validation set to provide an evaluation of a fit of the first model on the training set while tuning the first model, and
use the test set to provide an evaluation of the first model on the training set.

17. The non-transitory computer-readable medium of claim 15, wherein the one or more instructions that, when executed by the one or more processors, cause the one or more processors to process the transaction information and the entity information to identify the set of related entities and the type of relationship associated with the set of related entities, further cause the one or more processors to:
utilize machine learning to process the transaction information and the entity information to identify the set of related entities and the type of relationship associated with the set of related entities.

18. The non-transitory computer-readable medium of claim 15, wherein the one or more instructions, when executed by the one or more processors, further cause the one or more processors to:
obtain transaction information associated with the set of related entities;
process, using a third model, the transaction information associated with the set of related entities to determine an occurrence of another event; and
determine, using a fourth model, an additional modification to the set of accounts based on the occurrence of the other event.

19. The non-transitory computer-readable medium of claim 15, wherein the one or more instructions, when executed by the one or more processors, further cause the one or more processors to at least one of:
provide a recommendation to form a joint account associated with the first entity and the second entity;

automatically close a first account included in the set of accounts;
provide a recommendation to modify a second account included in the set of accounts;
automatically modify the second account;
automatically provide one or more links for establishing a telephone call to an account provider associated with the first account;
provide a recommendation to open a new account; or
automatically open the new account.

20. The non-transitory computer-readable medium of claim 15, wherein the one or more instructions, when executed by the one or more processors, further cause the one or more processors to:
automatically cause a first account included in the set of accounts to be closed; and
provide information indicating that the first account has been closed.

* * * * *